US009036620B2

(12) United States Patent
Procopio et al.

(10) Patent No.: US 9,036,620 B2
(45) Date of Patent: May 19, 2015

(54) METHOD, AND RELATED MOBILE COMMUNICATIONS SYSTEM, FOR PROVIDING COMBINATIONAL NETWORK SERVICES

(75) Inventors: Roberto Procopio, Turin (IT); Mauro Ficaccio, Turin (IT)

(73) Assignee: Telecom Italia S.p.A., Milan (IT)

( * ) Notice: Subject to any disclaimer, the term of this patent is extended or adjusted under 35 U.S.C. 154(b) by 2187 days.

(21) Appl. No.: 11/664,676

(22) PCT Filed: Oct. 6, 2004

(86) PCT No.: PCT/EP2004/052452
§ 371 (c)(1),
(2), (4) Date: May 9, 2008

(87) PCT Pub. No.: WO2006/037375
PCT Pub. Date: Apr. 13, 2006

(65) Prior Publication Data
US 2008/0316998 A1   Dec. 25, 2008

(51) Int. Cl.
*H04L 12/66*  (2006.01)
*H04L 29/06*  (2006.01)
*H04M 7/12*  (2006.01)
(Continued)

(52) U.S. Cl.
CPC ............ *H04L 65/1016* (2013.01); *H04M 7/123* (2013.01); *H04W 76/02* (2013.01); *H04W 80/10* (2013.01); *H04W 88/06* (2013.01); *H04L 67/14* (2013.01)

(58) Field of Classification Search
USPC ......... 370/352, 373, 377, 384, 385, 522, 524, 370/354; 379/229, 221.08, 221.09, 221.1, 379/221.12
See application file for complete search history.

(56) References Cited

U.S. PATENT DOCUMENTS 7,227,849 B1 *   6/2007   Rasanen .................. 370/329
2004/0076145 A1 *   4/2004   Kauhanen et al. ........ 370/352

FOREIGN PATENT DOCUMENTS

| EP | 1 182 900 A1 | 2/2002 |
| EP | 1 370 056 A1 | 12/2003 |
| WO | WO 03/003767 A1 | 1/2003 |

OTHER PUBLICATIONS

Sophia Antipolis, Telecom Italia S.P.A., "Discussion on 'Combining CS Bearers with IMS'", made for the 3GPP TSG-SA2 Meeting #40, pp. 1-4, May 17-21, 2004.

(Continued)

*Primary Examiner* — Asad Nawaz
*Assistant Examiner* — Stephanie Chang
(74) *Attorney, Agent, or Firm* — Finnegan, Henderson, Farabow, Garrett & Dunner, L.L.P.

(57) ABSTRACT

In a mobile communication system including a circuit-switched (CS) mobile communications network, a packet-switched (PS) mobile communications network and an interworking function adapted to enable a signaling exchange between the CS and PS mobile communications network, a method of providing combinational CS+PS services to mobile users includes receiving, at a serving network entity in the PS mobile communications network, a user request issued from a first user on the PS mobile communications network, the user request relating to combinational services and having the serving network entity managing the received request, wherein the managing of the received request includes controlling an establishment of a session in the CS mobile communication network through the interworking function.

29 Claims, 12 Drawing Sheets

(51) Int. Cl.
*H04L 29/08* (2006.01)
*H04L 12/50* (2006.01)
*H04Q 11/00* (2006.01)
*H04J 3/12* (2006.01)
*H04W 76/02* (2009.01)
*H04W 80/10* (2009.01)
*H04W 88/06* (2009.01)

(56) References Cited

OTHER PUBLICATIONS

Olsson et al.; "Combinational Services—The Pragmatic First Step Toward All-IP", Ericsson Review, No. 2, pp. 66-71, (2003).
3rd Generation Partnership Project; Technical Specification Group Services and Systems Aspects; "Network Architecture", (Release 5), 3GPP TS 23.002 V5.12.0 pp. 1-52, (2003).
3rd Generation Partnership Project; Technical Specification Group Services and Systems Aspects; "IP Multimedia Subsystem (IMS)"; Stage 2, (Release 6), 3GPP TS 23.228 V6.6.0, pp. 1-178, (2004).
"ISDN user-network interface layer 3 specification for basic call control", International Telecommunication Union, ITU-T Recommendation Q.931, Series Q: Switching and Signalling, Digital Subscriber Signalling System No. 1—Network layer, pp. i-xi and 1-329, (1998).
"ISDN user-network interface layer 3 specification for basic call control; Amendment 1: Extensions for the support of digital multiplexing equipment", International Telecommunication Union, ITU-T Recommendation Q.931—Amendment 1, Series Q: Switching and Signalling, Digital Subscriber Signalling System No. 1—Network layer, pp. i-iii and 1-17, (1998).
Covering Note, General Secretariat International Telecommunication Union, Erratum1, "ISDN user-network interface layer 3 specification for basic call control", ITU-T Recommendation Q.931, 1 page, (2003).
Rosenberg et al.; "SIP: Session Initiation Protocol", rfc3261.DOC, Network Working Group, Request for Comments: 3261, Obsoletes: 2543, Category: Standards Track, pp. 1-240, (2002).
"Combing CS bearers with IMS", Vodafone UK, Agenda Item: 10.1 (CSI), Documents for: discussion and decision, 3GPP TSG-SA WG2 #39, Tdoc 3GPP S2-041401, 4 pages, (2004).
3rd Generation Partnership Project; Technical Specification Group Core Network; "Mobile Radio Interface Layer 3 Specification; Core Network Protocols"; Stage 3, (Release 1999), 3GPP TS 24.008 V3.19.0, pp. 1-451, (2004).
Data Networks and Open System Communications, International Telecommunication Union, ITU-T Recommendation X.31, "Support of Packet Mode Terminal Equipment by an ISDN", pp. i-iii and 1-59, (1995).

\* cited by examiner

METHOD, AND RELATED MOBILE COMMUNICATIONS SYSTEM, FOR PROVIDING COMBINATIONAL NETWORK SERVICES

CROSS REFERENCE TO RELATED APPLICATION

This application is a national phase application based on PCT/EP2004/052452, filed Oct. 6, 2004, the content of which is incorporated herein by reference.

FIELD OF THE INVENTION

The present invention generally relates to the field of telecommunications, particularly to mobile communications networks allowing communications between mobile users. More specifically, the invention relates to the implementation of so-called combinational services, allowing mobile users of a mobile communications system that includes a circuit-switched mobile communications network and a packet-switched mobile communications network to exploit services delivered through both the circuit-switched and the packet-switched mobile communications networks at the same time.

BACKGROUND OF THE INVENTION

Mobile communications networks were initially conceived for enabling voice communications, similarly to the wired, Public Switched Telephone Networks (PSTNs), but between mobile users.

Mobile communications networks have experienced an enormous spread, especially after the introduction of second-generation mobile cellular networks, and particularly digital mobile cellular networks such as those complying with the Global System for Mobile communications (GSM) standard (and its United States and Japanese counterparts).

The services offered by these cellular networks in addition to plain voice communications have rapidly increased in number and quality; just to cite a few examples, Short Messaging System (SMS) and Multimedia Messaging System (MMS) services, and Internet connectivity services have been made available in the last few years.

Mobile communications networks started as Circuit-Switched (CS) networks, similarly to the PSTN; this scheme is satisfactory for supporting voice communications, but offer very poor data exchange capabilities, because the bandwidth that can be allocated for a given user is necessarily limited. In order to exchange relatively large amounts of data, it is preferable to adopt a Packet-Switched (PS) scheme, like in computer networks and, among them, the Internet.

In order to overcome the limitations of conventional, CS mobile communications networks such as the GSM networks, so as to enable mobile users efficiently exchanging, through their mobile phones, relevant amount of data and enjoy the navigation through the Internet, PS network infrastructures have been added to the CS mobile communications networks. One of the solutions that have acquired a significant popularity is the General Packet Radio Service (shortly, GPRS). The GPRS, essentially a GSM add-up, is a digital mobile phone technology compatible with GSM networks (actually, built on the existing GSM network architecture) that supports packet-based data communication, thereby enabling data transfer at a speed higher than that allowed by pure GSM. Mobile phones (or User Equipments—UEs) capable of accessing both the CS and the PS mobile networks have been put on the market, and are currently commercialized.

Initially, PS mobile network infrastructures were conceived to allow mobile users to access a packet-based network, typically the Internet, and exploit services offered by specific Internet servers. As an evolution of this approach, the $3^{rd}$ Generation Partnership Project (3GPP) has set forth specifications (particularly, the 3GPP Technical Specification TS 23.228, which is to be considered enclosed herewith by reference) for defining an open IP (Internet Protocol) based (i.e., packet-based) service infrastructure (the so-called IP Multimedia Subsystem—IMS) that will enable an easy deployment of new rich multimedia communication services mixing telecom and data services, and particularly person-to-person IP multimedia services, that are expected to be very attractive for customers.

In a scenario in which a generic mobile UE can access, at the same time, both a CS mobile communications network and a PS mobile communications network, particularly an IMS PS network, combining services offered by the CS network (e.g. CS calls) with the IP-based services, made available through the PS network, particularly person-to-person IP multimedia services, may significantly extend the mobile communications capabilities.

For the purposes of the present description, by "combinational service" there is intended a mobile communication service being a combination of services delivered through at least one CS session and at least one concurrent PS session.

For example, combinational services may allow a user speaking with another user, using the CS domain, and, at the same time, using the PS domain, sending to the other user a file, e.g. an image, or playing any sort of game with him/her (gaming).

Up to now, the implementation of combinational services completely relies on the functionality of the UEs.

The general and specific architecture of mobile communications networks (particularly, Public Land Mobile Networks—PLMN) is defined in the 3GPP TS 23.002, which is to be considered enclosed herewith by reference. According to this specification, the accesses of a user to both the PS and CS domain of a mobile communication system are used separately in order to provide independent services to the end user, such as voice calls, for the CS domain, and data service, e.g. Web browsing, for the PS domain. To this end, the CS and PS domains are handled through their own call/session signalings: for the CS domain, they may be of the type specified in the 3GPP TS 24.008 (or, alternatively, signalings complying with the Q.931 or X.31 protocols, or other UNI—User to Network Interface—protocols); for the PS domain, the signaling is compliant to the SIP (Session Initiation Protocol), an IETF (Internet Engineering Task Force) proposed standard for setting up sessions between one or more clients in IP-based networks.

Based on this scheme, in order to set-up a combinational service the generic UE of a mobile communications system including a CS and a PS networks has to simultaneously set up a CS call and a PS session, and needs to be capable of performing a coordination of the CS call and PS session signalings.

More particularly, the UE sets up a CS call and a PS session, that, from the network viewpoint, are completely unrelated, and only the UE is responsible for performing a coordination of the CS and PS signaling. In other words, only the UE is actually aware of the fact that the session in the PS domain is joined to, or combined with, the CS call. On the contrary, the network (and its operator), is completely unaware of this fact, the PS session and the CS call being not linked in any way with each other. Some problems of this implementation of combinational services have been addressed by the Applicant in a submission entitled "Discussion on 'Combining CS with IMS'", made for the 3GPP TSG-SA2 Meeting #40, which was held on 17-21 May 2004.

In particular, in that document the Applicant made a distinction between two possible approaches to combinational service implementation, respectively called "CS/CSB" and "IMS/CSB" (acronyms that stand for "Circuit Switched/Combining CS Bearer with IMS" and "IMS/Combining CS Bearer with IMS").

Essentially, as explained in that document, the CS/CSB approach is characterized by the re-use of existing CS domain service logic, where the set-up of a voice media is done via legacy CS call control, i.e. 3GPP TS 24.008 signaling, as mentioned in the foregoing. Thus, the call & bearer control for voice services is kept on the CS domain (24.008 signaling), the session control for IMS services is done via SIP/IMS signaling, and the bearer control for non-conversational class IMS services is done via PS domain.

In the IMS/CSB approach, instead, IMS services are offered reusing IMS service logic at control plane, and making use of "CS domain bearers" rather than traditional "PS domain bearers" at bearer plane, each time a real-time media component has to be set-up. Thus, the session control for all services (including voice) is done via SIP/IMS, the bearer control for conversational media is done via CS signaling (3GPP TS 24.008), and the bearer control for non-conversational media is done via PS domain.

The Applicant observed in that document that despite the CS/CSB approach is simpler than IMS/CSB, it should only be considered as an (optional) intermediate, easier step towards the latter approach, due in particular to the very limited level of control that the network can apply to the different CS and PS media with respect to the IMS/CSB approach, since voice media and non-voice media are handled separately by different core network domains.

In a submission entitled "Combining CS bearers with IMS", made by Vodafone UK for the 3GPP TSG-SA2 Meeting WG2 #39, which was held on 19-23 Apr. 2004, after having explained that, currently, 3GPP's IMS specifies the use of SIP signaling to establish sessions using PS bearers to carry the media, there is stated that quality of service and radio efficiency issues, associated with trying to use GPRS bearers for real-time IP sessions, may delay the rollout of IMS for real-time services. In that document Vodafone UK proposes a solution and discloses a potential mechanism for using SIP signaling to set up a session that will use a CS bearer to carry the media. In particular, a SIP Application Server (AS) is used that acts in a back-to-back user agent mode and which can control a media gateway.

SUMMARY OF THE INVENTION

The Applicant has observed that a UE-centered implementation of combinational services may pose several problems.

For example, problems in properly charging the users that exploit the combinational service may be encountered by the network operator: since the PS session is not viewed as linked in any way to the CS call, they are charged separately, with the consequence that the user will be billed twice, once for the traffic exchanged in the PS session, and another time for the CS call. This may be considered unsatisfactory, and may refrain users from exploiting the services: according to Applicant, a double charging and billing may be inappropriate for a combinational service, that should be perceived by the users as a single service.

Another problem relates to the fact that an implementation exclusively driven by the capabilities of the UEs may oblige the network operator to continuously modify the infrastructure in order to cope with the continuous improvements in the UE technology.

The risk of facing the high costs involved in this continuous changing of the network infrastructures may refrain the network operators from deploying the combinational services.

A further problem is that each modification in the signaling communication management, usually implied by a change in the offered service (for example because the network operator wishes to implement a new combinational service, or a new functionality in an already existing combinational service), needs to change or at least modify, or update, all the circulating UEs. For example, if the network operator has first launched a given combinational service, and subsequently it decides to implement also another service which requires a different handling of the signaling, it would be necessary to change the signaling management inside all the UEs of the users of the original combinational service.

The Applicant has faced the problem of how to make the implementation of combinational services less affected by the problems discussed, as well as by other problems, and particularly of how to make the implementation of such services less dependent on the UE, and more under control of the network operator. Furthermore, the Applicant has faced the problem of avoiding that, due to a change in the signaling at the network level, all the already circulating UEs need to be substituted or updated.

Stated in general terms, the Applicant has found, and hereby proposes, a solution in which a generic UE, which is accessing a PS domain, is allowed to setup/maintain/release a CS session, e.g. a voice call, towards another user (UE) simply requesting it through the signaling of the PS domain.

In other words, according to the present invention, the generic CS service is controlled by the session signaling on the PS domain, as if it was a media stream in the PS domain. Thus, according to the present invention, the request/maintaining and release of a CS-domain bearer service is performed by means of the signalings in the PS domain, controlling the CS-domain signaling.

In order to have the CS domain (CS session) signaling controlled by the session signaling on the PS domain, an exchange of interworking information is provided for between a server in the PS domain, for example an application server of the IMS architecture, and a Media Gateway Control Function (MGCF) that can access the signaling of the CS domain, for example a 3GPP-compliant MGCF; the MGCF, which is capable of translating the PS-domain (e.g. SIP/IMS) signaling into the CS domain (e.g., ISUP) signaling, may be part of the PS-domain (i.e., under control of the operator of the PS network) or of the CS domain (i.e., under control of the operator of the CS network).

The MGCF is adapted to establish/maintain/release a CS session, e.g. a voice call, in $3^{rd}$ Party Call Control (3PCC) mode (as known in the art, an operating mode in which a CS call is originated and controlled not by a UE, but by a third-party network entity), i.e. the MGCE is capable of causing the setting up, in the CS domain, of two (possibly more) call portions, both terminated to (answered at) respective mobile user equipments, and to join these two (or more) call legs to put a calling user in (CS) connection with an intended called user.

In other words, a generic UE wishing to set-up a combinational service session with an intended destination UE sends PS (e.g., SIP) signaling towards the application server on the PS domain, and as a consequence the server, through the MGCF, causes the setting up of the desired CS service, e.g. a voice call, on the CS domain, using the CS signaling toward the UE (network to user direction). The generic CS service is then controlled by the session signaling on the PS domain as if it was a media stream in the PS domain. The CS call control signaling, which may be for example of the type defined in the 3GPP TS 24.008, BICC (Bearer Independent Call Control) or ISUP (ISDN User Part protocol), is seen as a bearer control signaling slave of the SIP session signaling.

According to a first aspect of the present invention, there is therefore provided a method of providing combinational services as set forth below.

In a mobile communication system including a circuit-switched (CS) mobile communications network and a packet-switched (PS) mobile communications network, and an interworking function adapted to enable a signaling exchange between the CS and PS mobile communications networks, a method according to the present invention of providing combinational CS+PS services to mobile users comprises:

receiving, at a serving network entity in the PS mobile communications network, a user request issued from a first user on the PS mobile communications network, the user request relating to combinational services; and having the serving network entity managing the received request, wherein said managing of the received request includes controlling an establishment of a session in the CS mobile communications network through the interworking function.

In particular, said PS mobile communications network includes an IMS network infrastructure; the serving network entity may comprise an application server of the IMS network infrastructure.

The interworking function may in particular include a Media Gateway Control Function, adapted to interact with a Media GateWay in the CS mobile communications network.

The user request may in particular comprise SIP methods.

The serving network entity is in particular adapted to communicate with the interworking function via SIP signalings. According to an embodiment of the invention, the SIP signalings issued by the serving network entity to the interworking function are tagged as inherent to combinational services, and the interworking function is adapted to recognize the tagged SIP signalings received from the serving network entity. The tagging of the SIP signalings may for example be included in a SIP message header.

According to an embodiment of the invention, a signaling in the CS mobile communications network is chosen in a set consisting of 3GPP TS 24.008 signaling, Q.931 protocol signaling, X.31 protocol signaling, User-to-Network protocol signaling.

The interworking function may be adapted to communicate with the CS mobile communications network by means of ISUP signalings.

In an embodiment of the invention, said managing of the received request may in particular comprise:

identifying the received request as a request to set-up at least a CS session with at least one second user; and setting-up a CS session with the second user, said setting-up the CS session including:

signaling the interworking function to set-up a first CS session with the first user, and at least one second CS session with the at least one second user, and to join the first and the at least one second CS sessions so as to connect the first and second users, thereby establishing a CS bearer in the CS mobile communications network.

Said signaling the interworking function may include sending to the interworking function a first signaling for establishing the first CS session, at least one second signaling for establishing the at least one second CS session, and a third signaling for causing the interworking function join the first and at least one second CS sessions.

Said identifying the request from the first user as a request to set-up at least a CS session with the at least one second user may include identifying the request from the first user as a request to set-up a combinational CS+PS session with the at least one second user, and said managing the received request may further comprise:

in addition to said setting-up the CS session with the second user, setting-up at least one PS session with the second user, said setting up the at least one PS session including establishing at least one PS bearer in the PS mobile communications network.

The method may further comprise ascertaining an availability of the second user to support the combinational CS+PS session. Said setting-up a PS session with the second user may be conditioned to an ascertained availability of the at least one second user to support a PS session.

In an embodiment of the invention, said managing the received request may comprise:

identifying the received request as a request to set-up a PS session with at least one second user; and setting-up a PS session with the second user, said setting up the PS session including establishing a PS bearer in the PS mobile communications network.

The method may further comprise:

receiving, at the serving network entity, a further user request relating to a previously established combinational service, the previously established combinational service comprising at least a CS session between a first and at least one second user; and having the serving network entity managing the received further user request.

In particular, said managing the received her user request may comprise:

identifying the received her user request as a request to release the previously established combinational service; and signaling the interworking function to cause a release, in the CS mobile communications network, of a CS bearer that corresponds to the CS session.

The previously established combinational service may comprise a combinational CS+PS session; said managing the received further user request may in this case comprise causing a release, in the PS mobile communications network of a PS bearer that corresponds to the PS session.

In an embodiment of the present invention, said managing the received further user request may comprise:

identifying the received further user request as a request to temporarily place in hold the previously established combinational service, wherein the previously established combinational service comprises a CS+PS session including a PS bearer in the PS mobile communications network, and a CS bearer in the CS mobile communications network; and placing in hold the PS bearer.

Said managing the received further user request may also comprise:

identifying the received further user request as a request to resume the previously established combinational CS+PS session temporarily placed in hold; and resuming the PS bearer.

In an embodiment of the invention, said managing the received request may comprise managing a redirection of a user request directed to a second user to a third user, in case a call forwarding feature is enabled.

According to a second aspect of the present invention, a mobile communication system includes:

a circuit-switched (CS) mobile communications network;

a packet-switched (PS) mobile communications network, and an interworking function adapted to enable a signaling exchange between the CS and PS mobile communications networks, a serving network entity in the PS mobile communications network, adapted to:

receive a user request, issued from a first user on the PS mobile communications network, the user request relating to combinational services, and manage the received request, wherein said manage the received request includes controlling an establishment of a session in the CS mobile communications network through the interworking function.

Said PS mobile communications network may include an IMS network infrastructure.

The interworking function may include a Media Gateway Control Function, adapted to interact with a Media GateWay in the CS mobile communications network.

The serving network entity may comprise an application server of the IMS network infrastructure.

The user request may comprise SIP methods.

The serving network entity may be adapted to communicate with the interworking function via SIP signalings.

A signaling in the CS mobile communications network may be chosen in a set consisting of 3GPP TS 24.008 signaling, Q.931 protocol signaling, X.31 protocol signaling, User-to-Network protocol signaling.

Said interworking function may be adapted to communicate with the CS mobile communications network by means of ISUP signaling.

Thanks to the present invention, the responsibility of the coordination of the two bearers (CS and PS) is not on the UEs, being instead handled completely by the network (particularly by the server, e.g. the application server, in the PS network), i.e. the implementation of combinational services becomes network-centric, rather than UE-centric.

Several are the advantages of the proposed solution. For example, each modification in the signaling communication management, usually implied by a change in the offered service, does not require that all the UEs should be changed nor modified, e.g. updated: it would be enough to change the service logic in the PS network application server that is responsible of managing the access at the two network domains (CS and PS).

Additionally, a network operator is left free to change the management of an already implemented combinational service, e.g. a voice+video service, in order to adapt it to new market requirements, as well as to introduce a new features, such as call forwarding features, enriching the voice+video service for its users.

Advantageously, the network operator can implement, for example in the application server, a unique charging for the combined CS-PS services, thus simplifying the charging collection and the post-analysis of the relative CDRs (Call Data Records), created by network operators in respect of each service used, and containing information such as the telephone number of the calling user, the telephone number of the called user, the duration of the usage.

BRIEF DESCRIPTION OF THE DRAWINGS

The features and advantages of the present invention will be made apparent by the following detailed description of an embodiment thereof, provided merely by way of non-limitative example, description that will be conducted making reference to the annexed drawings, wherein.

DETAILED DESCRIPTION OF THE PREFERRED EMBODIMENT(S) OF THE INVENTION

In the following description, reference will be made by way of example to a mobile communications system including a GERAN (GSM/EDGE Radio Access Network, where EDGE stands for Enhanced Data for GSM Evolution) PLMN, i.e. a mobile communications network in which the radio access network portion (the radio front-end towards the users) is based on the GSM standard; however, it is pointed out that this is not to be construed as a limitation of the present invention, which can be applied in general to any kind of PLMN, irrespective of the radio access type; in particular, it is underlined that the invention can be applied to UTRAN (UMTS Terrestrial Radio Access Network) PLMNs.

Figure 1:
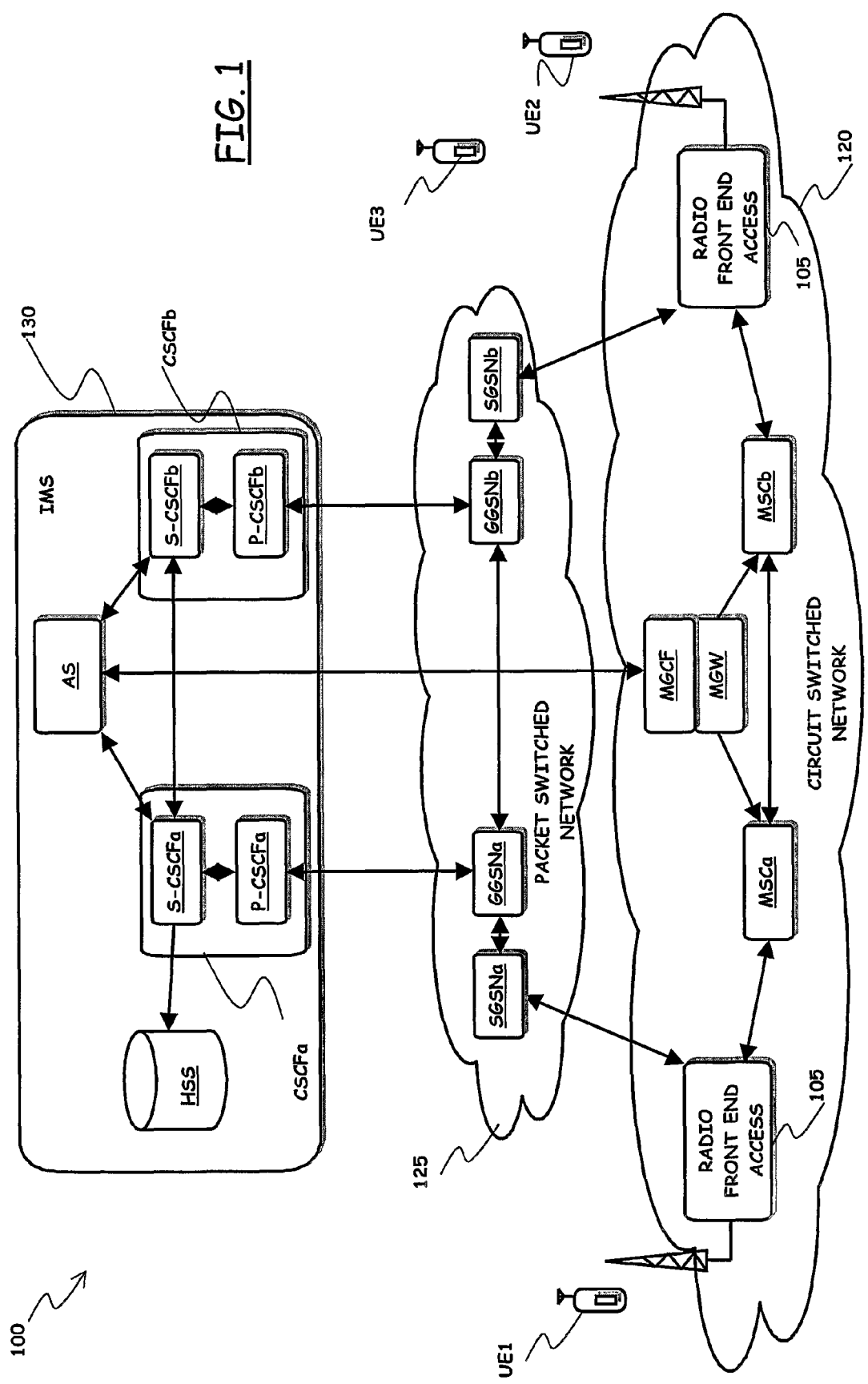
FIG. 1 schematically shows a mobile communications system including a CS and a PS mobile communications networks, and adapted to implement a method according to an embodiment of the present invention.

Referring to the drawings, FIG. 1 schematically shows a mobile communications system 100 adapted to implement a method according to an embodiment of the present invention; particularly, and merely by way of example as mentioned above, the mobile communications system 100 comprises a GERAN PLMN infrastructure.

The mobile communications system 100 comprises a radio access network portion (front-end) for allowing mobile User Equipments (UEs), e.g. GSM/GPRS or GSM/EDGE mobile phones accessing the network. In the drawing, the radio front-end is not depicted in detail, being per-se known and not essential for the understanding the present invention, and is therefore represented by boxes identified by reference numeral 105, with associated antennas.

The specific structure of the radio front-end of the mobile communications system 100 will depend on the mobile communications network type: in the exemplary case herein considered, the radio front-end 105 comprises a plurality of Base Station Subsystems (BSSs), each one providing coverage for mobile communications in a respective geographic region. The generic BSS comprises a plurality of Base Transceiver Stations (BTSs), each one covering a respective geographic area (a so-called "cell") within the region covered by the BSS; the generic BTS communicates with the UEs which are located in the BTS's cell, such as the UEs UE1 and UE2. Typically, many BTSs are connected to a same Base Station Controller (BSC), a network unit that controls the BTSs; roughly speaking, the BTSs handle the actual transmission/reception of signals to/from the UEs, whereas the BSCs instruct the different BTSs about the information to be transmitted on specified physical, radio communication channels.

Groups of different BSSs are connected to respective Mobile Switching Centers (MSCs), like the two MSCs MSCa and MSCb shown in the drawing. The generic MSC performs the function of gateway to other MSCs of the same mobile communications network, to the MSCs of other mobile communications networks, to one or more wired, PSTNs. As known in the art, the MSC is associated with a Home Location Register (HLR), containing subscription data of users subscriber to the mobile communications network, particularly mobile phone numbers, and with a Visitor Location Register (VLR), containing information on where the various users are located at a given point of time, i.e. under which cell of the mobile communications network they are currently registered. Based on this information, the MSC switches, i.e., properly routes calls from callers to called users.

The radio front-end, with the BTSs and the BSCs, as well as the MSCs, are part of a CS mobile communications network 120, or CS domain of the mobile communications system 100; in this CS domain, mobile users, through their UEs, like the two UEs UE1 and UE2 shown in the drawing, can set-up CS (voice) calls and speak to each other (and, possibly, exploit of other services like exchanging SMS messages).

FIG. 1 also depicts schematically core network elements that implement a PS mobile communications network (or PS domain of the mobile communications system) 125, associated with the CS network 120. In particular, in the exemplary case of a PS mobile communications network in accordance with the GPRS standard, and without entering into excessive details, known per-se in the art and not relevant to the understanding of the invention embodiment herein described, Gateway GPRS Support Nodes (GGSN), like the two GGSN GGSNa and GGSNb in the drawing, act as an interface between the mobile communications network and other, external packet data networks, such as the Internet, or other PS mobile communications networks (e.g. of other network operators). The GGSNs exchange data packets, through a GPRS backbone network, with Serving GPRS Support Nodes (SGSN), such as the two SGSNs SGSNa and SGSNb shown in the drawing. The generic SGSN is associated with one or more respective BSSs of the CS network 120, through Packet Control Units (PCUs), not shown in FIG. 1, and routes the data packets received from the GGSNs to the proper destination UEs, located in the geographic area covered by the respective BSS (or by one of the respective BSSs). In particular, the generic SGSN keeps track of the geographical location of the UEs, so as to know where the data packets are to be routed in order to be delivered to the intended destination UE. The PCU converts the data packets, received from the respective SGSN, into data streams adapted to being transmitted "over the air", by one of the BTSs, exploiting the radio resources of the mobile communications network; similarly, data streams transmitted by the UE "over the air" and received by the BTS are converted into data packets formatted according to the protocol supported by the internal packet-based data communications network, for transmission to the respective SGSN. It is observed that a single SGSN may communicate with a plurality of GGSN, for receiving data packets from different external packet data networks.

A 3GPP-compliant IP Multimedia Subsystem (IMS) infrastructure 130 is associated with the PS network 125, for enhancing the packet-based communications capabilities of the network. The basic elements of the IMS infrastructure 130 are depicted schematically in FIG. 1, and include Call Session Control Functions (CSCF), like the two CSCF CSCFa and CSCFb shown in the drawing; without entering into details, the CSCFs include Proxy Call Session Control Functions (P-CSCFs), like the two P-CSCFs P-CSCFa and P-CSCFb shown in the drawing, connected to respective Serving Call Session Control Functions (S-CSCFs) S-CSCFa and S-CSCFb. Roughly speaking, the P-CSCFs P-CSCFa and P-CSCFb are the interface between the UEs and the IMS infrastructure 130; they behave as proxy, accepting requests from the UEs and internally managing or forwarding them to, e.g., the S-CSCFs; the S-CSCFs can in turn behave as a Proxy, accepting the incoming requests and managing them internally, or forwarding them to other elements of the IMS infrastructure, such as the Interrogating Call State Control Functions (I-CSCFs, not shown in the drawing), which is the contact to operator's network and takes care of assigning S-CSCFs to the users for the registration of the SIP type, routing SIP requests, retrieving S-CSCFs' addresses (through a Home Subscriber Server—HSS, schematically shown in the drawing and identified therein as HSS).

The S-CSCFs, like the two S-CSCFs S-CSCFa and S-CSCFb shown in the drawing, colloquiate with an application server AS, wherein applications for providing specific services run.

The mobile communications system 100 further includes a Media GateWay (MGW) MGW, a network functional entity that terminates bearer channels from a CS network and media streams from a PS network (e.g., RTP streams in an IP network). The MGW MGW supports media conversion, bearer control and payload processing (e.g. codec, echo canceller, conference bridge), and is provisioned with the necessary resources for supporting UMTS/GSM transport media.

The MGW MGW interacts for resource control with a Media Gateway Control Function (MGCF) MGCF, further provided in the mobile communications system 100, and adapted to access the signaling of the CS domain; for example, the MGCF MGCF is a 3GPP-compliant MGCF, and can be indifferently located inside or outside the IMS infrastructure 130. The MGCF is a network functional entity introduced by the above-cited 3GPP TS 23.228, setting forth the IMS infrastructure. In particular, without entering into too much detail, as mentioned in the 3GPP TS 23.002, the MGCF MGCF performs the following actions:

controlling the parts of the call state that pertain to connection control for media channels in the MGW;
communicating with the CSCFs.

selecting the CSCF depending on the routing number for incoming calls from legacy networks (e.g., PSTN or other PLMN);

performing protocol conversion between CS domain signalings (e.g. ISUP) and the IMS call control protocols (like SIP); and forwarding of out of band information (like BICC protocol) received at the MGCF to the CSCF/MGW.

According to an embodiment of the present invention, the application server AS, in the PS domain, exchanges interworking information with the MGCF MGCF; in particular, according to an embodiment of the present invention, the MGCF MGCF and the MGW MGW, under instruction by the application server AS, are adapted to establish/maintain/release a CS call, e.g. a voice call in 3PCC mode, i.e. the MGCF is capable of causing the setting up, in the CS domain, of two legs of call to respective UEs, both terminated at the UEs UE1 and UE2, and to join these two legs to put the users of the two UEs in connection with each other, i.e. to put the calling user in connection with the called user.

The method according to the embodiment of the present invention herein considered will be now described, firstly in general terms, then in detail, and a set of specific, exemplary procedures will be presented.

Stated in general terms, the method according to an embodiment of the present invention allows a user equipped with a suitable UE, e.g. UE1 in the drawing, which is accessing the PS domain, to setup/maintain/release a CS session (call), e.g. a voice call, towards the UE of another user, e.g. UE2, requesting the CS call setup/maintain/release through the signaling over the PS domain.

For the purposes of the present description, by "suitable UE" there is intended a UE adapted to sustain simultaneously PS sessions and CS sessions, particularly an IMS-capable UE.

In particular, according to an embodiment of the present invention, the establishment of the generic CS domain service is controlled by the session signaling in the PS domain, as if it was a media stream of the PS domain.

In the exemplary case of the IMS, the signaling in the PS domain that also controls the CS domain service is a SIP signaling.

For example, in order to combine a CS (e.g. voice) call with a PS session, e.g. to add a voice call to an already existing PS session between two users, one of the users, e.g. the calling user UE UE1, shows such an intention by means of a PS-domain session signaling; for example, in the case of SIP signaling, the user sends to the other user an INVITE SIP message with a Session Description Protocol (SDP) specifying the media AUDIO. In the SIP protocol, the INVITE message is a method indicating that the called user is invited to take part to a two-parties call or to a conference call; using the SDP, the UE of the calling user specifies in the message body the type of data (e.g. audio, video, both) that it can receive, on which channels it wishes to transmit, the respective parameters, the destination UE (of the called user).

Figure 2A:
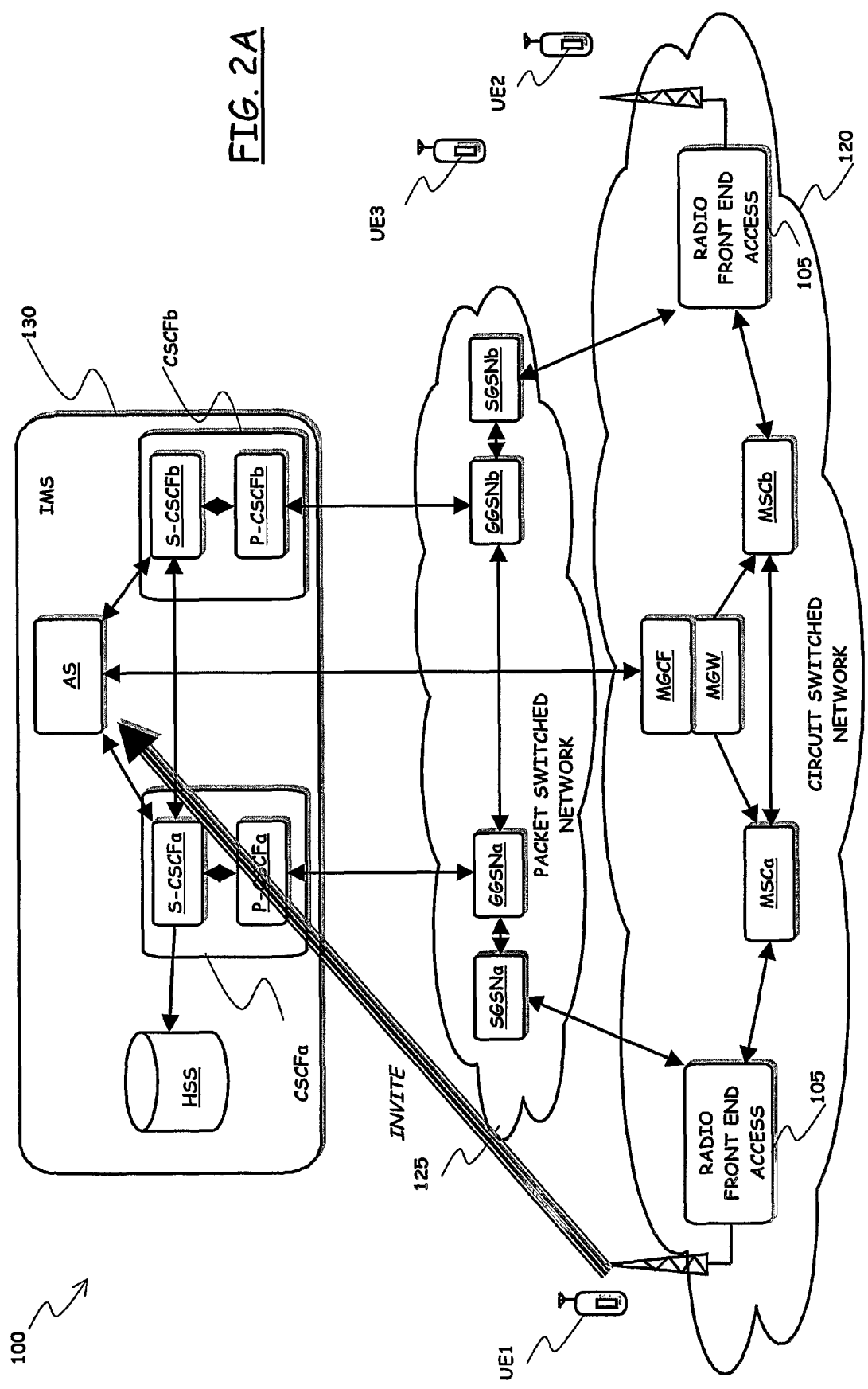
FIGS. 2A to 2D are simplified pictures of the mobile communications system of FIG. 1, illustrating in a simplified way a succession of events leading to the set-up of a combinational PS session plus CS session between two UEs, according to an embodiment of the present invention.
Figure 2B:
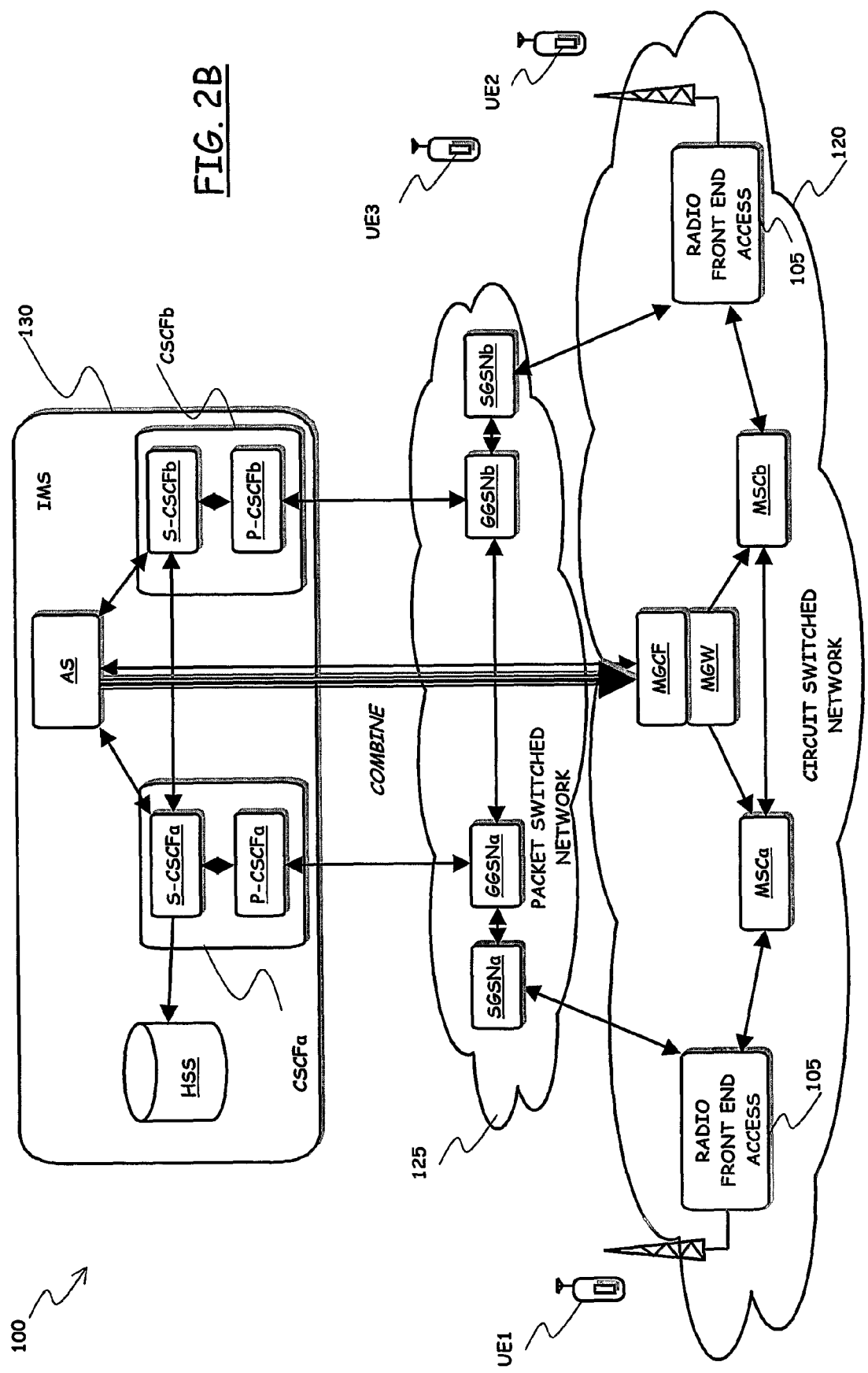
Figure 2C:
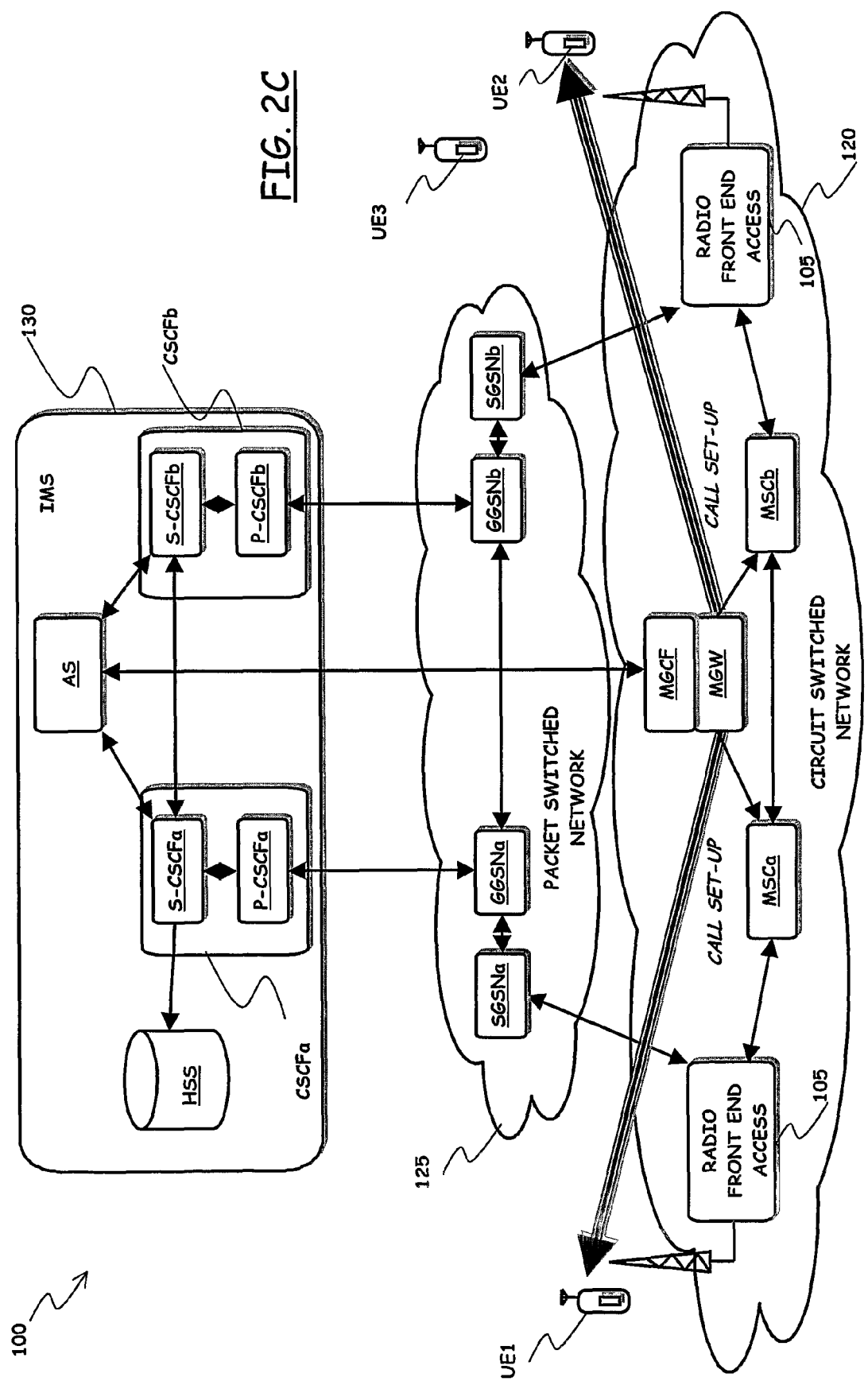
Figure 2D:
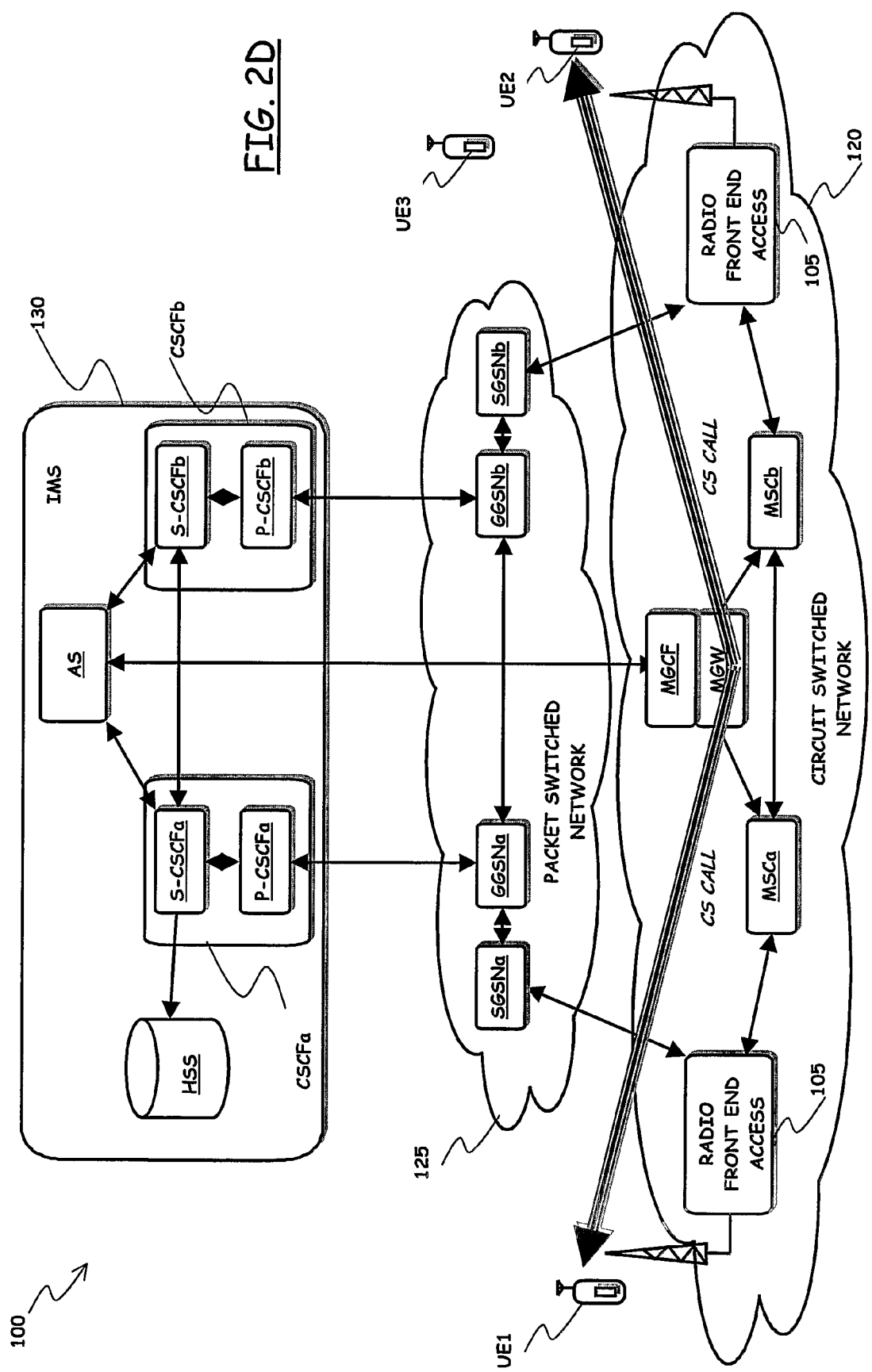

This INVITE message is "intercepted" by the application server AS (FIG. 2A); based on its internal working criteria, the application server AS realizes that the calling user UE UE1 is requesting a CS service as a bearer, and then, by means of a SIP method in accordance with an embodiment of the present invention (COMBINE method—FIG. 2B) sends to the MGCF MGCF a command that causes the MGCF to trigger the 3PCC functionality and to set up two legs of CS calls, with the two UEs UE1 and UE2, both terminated at the respective UE (FIG. 2C), and to join these two legs of CS call to make the calling user equipment UE1 in connection with the called user equipment UE2 (FIG. 2D).

In particular, the COMBINE SIP method according to an embodiment of the present invention causes the MGCF/MGW to set-up (in 3PCC mode) and then to join/combine at least two CS call portions (legs of CS calls) by specifying to the MGCF the identities of the users that are involved in the call established in 3PCC mode, and towards which the CS call legs are terminated, and specifying the identifiers of the CS call legs. In particular, according to an embodiment of the present invention, the application server AS sends to the MGCF MGCF two (or more, depending on the number of CS call legs to be established) INVITE messages, having a dedicated message header, or "COMBINE HEADER", containing the indication of the CS calls connection that the MGCF have to perform, e.g. the call direction of the two CS calls to be combined.

For example, the message header includes the identity of the calling user (Calling User Identity) and the identity of the called user (Called User Identity). In case the call legs to be combined are more than two, the user identities are for example written in the header starting from that of the user that began the call.

In the following, with the help of the signaling diagrams of FIGS. 3 to 10, a set of exemplary procedures that use the method according to an embodiment of the present invention will be described in detail. The procedures that will be described relate in particular to:

1—the set-up of a CS+PS (audio+data) session;
2—the set-up of a CS (audio) session;
3—the upgrade of an already established CS (audio) session to a CS+PS session (combining for example audio with video);
4—the fall-back to a CS (audio) session;
5—the release of a session;
6—the hold and resume of a session;
7—the unconditional or "on-busy" forwarding of a CS+PS session; and
8—the forwarding on "no reply" of a CS+PS session.

In the signaling diagrams, the convention is adopted that SIP signalings (i.e., signalings in the PS domain) is represented by solid lines, whereas 24.008/ISUP signaling (i.e. signalings in the CS domain) is represented by dash-and-dot lines.

1—Setup of Audio+Data Session

Figure 3:
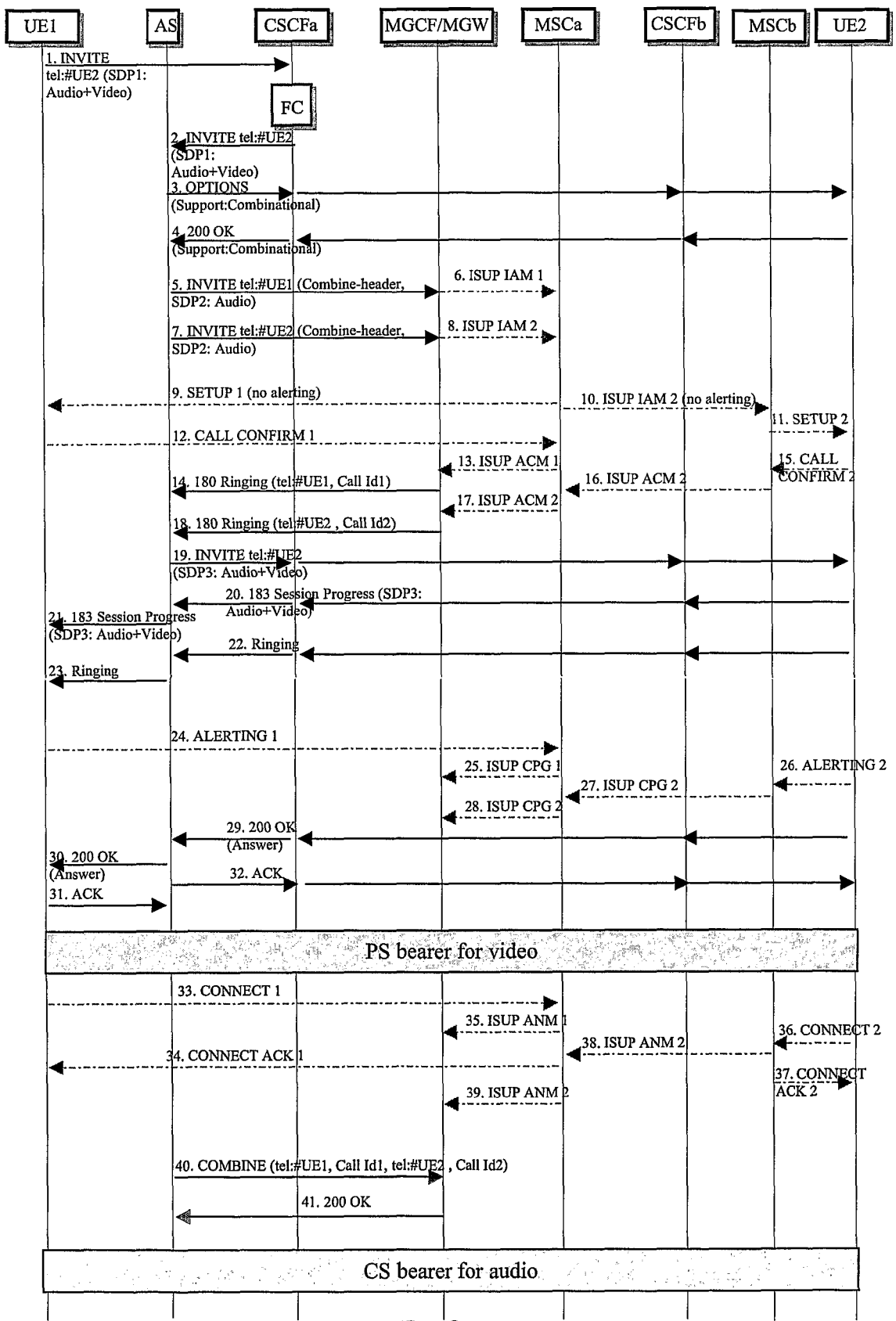
FIG. 3 shows schematically, but in greater detail than in FIGS. 2a to 2D, the signalings between the different network entities leading to the set-up of a combinational PS session plus CS session between two UEs, in an embodiment of the present invention.

FIG. 3 shows the signalings between the different network entities in the case of a UE, e.g. UE1, requesting the establishment of a call in which a CS (audio) session is enriched by a general PS data session. This PS data session may be for example a video streaming between the UEs UE1 and UE2, in order to enable the respective users exchanging some video images.

Initially the UE UE1 sends (signaling 1 in the drawing) an INVITE message to the competent CSCF CSCFa, specifying in the message the identity of the called UE UE2, and using the SDP to describe, in the message body, the session as AUDIO+VIDEO; the identity of the called user is for example specified using the MSISDN (Mobile Station International ISDN Number), which is the standard international telephone number used to identify a given subscriber.

Then, the CSCF CSCFa may apply to the request (INVITE message) received from the caller user UE UE1 filter criteria that are specific for that UE; the filter criteria are criteria that the competent CSCF applies to the received user requests in order to determine to which server, in the IMS, the request is to be forwarded; for example, there may be a server responsible for gaming, and another server (the application server AS, in the present example) responsible for combinational services. The filter criteria are for example retrieved by the CSCF from a HSS, e.g. during a preceding IMS registration procedure by which the UE UE1 registers for IMS. Since the UE UE1 has specified AUDIO (in addition to VIDEO) in the message body of the INVITE message, the filter criteria allow the CSCF determining that the user request relates to a combinational service: the CSCF CSCFa forwards the INVITE message to the application server AS (signaling 2), which takes the control of the session.

The application server AS sends (signaling 3) an OPTIONS message to the UE UE2 in order to verify if the UE UE2 is registered to the IMS, and if it supports combinational services (CS+PS bearer services controlled by the same IMS session). The OPTIONS message is a SIP method that allows a CSCF of a calling user to request information on the behavior of the called user, particularly the state in which the called user is, and its availability to accept an INVITE. The OPTIONS message is sent to the UE UE2 through the competent CSCF CSCFb.

The called UE UE2 replies (signaling 4) with a 200 OK message (meaning that the request has been successfully accepted), confirming that it supports combinational services and, implicitly, that it is IMS registered.

The application server AS sends (signaling 5) an INVITE message to the MGCF MGCF, with a header COMBINE-HEADER specifying the MSISDN of the calling UE UE1 and describing only the media AUDIO in the message body (with the SDP).

The INVITE message sent by the application server AS to the MGCF MGCF triggers the sending (signaling 6) by the MGCF MGCF of an ISUP IAM message to the MSC that is currently controlling the UE UE1, in the example the MSC MSCa.

The application server AS also sends (signaling 7) another IAM E message with a header COMBINE-HEADER to the MGCF MGCF, this time specifying the MSISDN of the called UE UE2, and again describing only the media AUDIO in the message body (with the SDP). This second INVITE message sent by the application server to the MGCF triggers the sending (signaling 8) by the MGCF MGCF of an ISUP IAM message to the MSC MSCa that is currently controlling the UE UE1.

The MSC MSCa then sets up two mobile-terminated calls in ISUP towards UEs UE1 and UE2 (signalings 9 and 12 for the UE UE1, and signalings 10, 11, 15 and 16 for the UE UE2). In particular, concerning the UE UE1, the MSC MSCa sends (signaling 9) a 24.008 SETUP message to the UE UE1, which accepts and replies (signaling 12) with a 24.008 CALL CONFIRM message; concerning the UE UE2, the MSC MSCa forwards (signaling 10) the ISUP IAM message to the MSC MSCb that, in the example, is controlling the called UE UE2; the MSC MSCb sends (signaling 11) a 24.008 SETUP message to the UE UE2; the 24.008 CALL CONFIRM message received (signaling 15) at the MSC MSCb by the UE UE2 is notified (signaling 16) to the MSC MSCa as an ISUP ACM message. Preferably, the SETUP messages sent to the UEs specify no alerting, i.e., no ringing.

The establishment of the two CS call legs is acknowledged by the MSC MSCa to the MGCF/MGW MGCF/MGW through respective ISUP ACM messages (signaling 13 and signaling 17). In this way the MGCF MGCF can acknowledge the establishment of two call legs to the application server AS through 180 RINGING messages (signalings 14 and 18). These messages specify the MSISDNs of the calling/called UEs UE1/UE2, and the correspondent identifiers of the call (Call Identifiers), identifying the CS calls at level of the MGCF/MGW.

The application server AS, acting as a Back-to-Back User Agent (B2BUA), sends (signaling 19) an INVITE message to the UE UE2 specifying the MSISDN thereof and describing in the message body (via the SDP) the media AUDIO+VIDEO. Essentially, a B2BUA is a SIP-based logical entity that can receive and process INVITE messages as a SIP user agent, and that also acts as a SIP user agent client that determines how the request should be answered and how to initiate outbound calls. The B2BUA behavior is defined in the IETF RFC 3261. The INVITE message is sent to the UE UE2 through the competent CSCF CSCFb.

The UE UE2 replies to the SIP INVITE messages as in the case of a normal IMS session, with a 183 SESSION PROGRESS message, received at the CSCF CSCFb, forwarded to the CSCF CSCFa and intercepted by the application server AS (signaling 20). The application server AS continues to act as a SIP B2BUS in order to control the session progress; in particular, the application server AS forwards the 183 SESSION PROGRESS message to the calling UE UE1 (signaling 21). A RINGING message (signaling 22) is sent by the called UE UE2, received at the CSCF CSCFb, forwarded to the CSCF CSCFa and intercepted by the application server AS, that forwards the same to the calling UE UE1 (signaling 23 in the drawing).

Meanwhile, on CS domain side, the establishment of the two CS bearers proceeds, and 24.008/ISUP messages between the MSC MSCa and the MGCF/MGW MGCF/MGW make the latter aware of the call establishment progress (signaling 24 to 28). In particular, the calling UE UE1 sends a 24.008 ALERTING message to the MSC MSCa (signaling 24), and as a consequence the MSC MSCa notifies the MGCF/MGW MGCF/MGW with an ISUP CPG message (signaling 25); similarly, the called UE UE2 sends a 24.008 ALERTING message to the MSC MSCb (signaling 26), which notifies the MSC MSCa with an ISUP CPG message (signaling 27); the MSC MSCa forwards the ISUP CPG message to the MGCF/MGW MGCF/MGCF (signaling 28).

On the PS domain side, when the user of the called UE UE2 answers the INVITE message (with a 200 OK message, signaling 29), the answer is notified by the application server AS to the UE UE1 (signaling 30), which acknowledges (message ACK, signaling 31). The application server AS notifies the acknowledgment to the UE UE2 (signaling 32). A PS bearer for data, particularly video is thus established between the UE UE1 and the UE UE2, and the PS (video) session can thus start on the PS domain. Back to the CS side, the UE UE1 automatically sends (signaling 33) to the MSC MSCa a 24.008 CONTACT message when it receives from the application server AS the 200 OK message, as a consequence of the answer by the user of UE UE2. The MSC MSCa acknowledges the CONNECT received from the UE1 (with a CONNECT ACK message, signaling 34), and notifies the MGCF MGCF by means of an ISUP ANM message (signaling 35).

In turn, the UE UE2 automatically sends (signaling 36) to the competent MSC MSCb a 24.008 CONNECT message when it sends the 200 OK message, i.e. when the INVITE message is answered. The MSC MSCb acknowledges the CONNECT received from the UE2 (with a CONNECT ACK message, signaling 37), and notifies the MSC MSCa by sending (signaling 38) an ISUP ANM message, which the MSC MSCa forwards to the MGCF MGCF (signaling 39).

After receiving (in signaling 29) the 200 OK answer message from the UE UE2, the application server AS sends (signaling 40) a COMBINE message to the MGCF MGCF, specifying:
the identify of the called user (called user identity);
the identity (call identity) of the call leg towards the called UE UE2;
the identity of the calling user (calling user identity; and
the call identity of the call leg towards the calling UE UE1.

Finally (signaling 41), the MGCF MGCF joins, by means of the MGW MGW, the two CS call legs in order to make the UEs UE1 and UE2 connected one to another through a CS bearer, for the audio content, and it sends to the application server AS an acknowledge message 200 OK (signaling 41), thereby acknowledging the successful combination to the application server AS.

From now on, a combination of a PS bearer (for video) and a CS bearer (for audio) is available to the users of the UEs UE1 and UE2.

Preferably, if the combining of the two CS call legs cannot be performed, the MGCF MGCF sends to the application server AS an error message (like COMBINING NOT POSSIBLE), with the indication of the reason by means of a cause value indication.

It can be appreciated that the setting-up of the combined PS and CS sessions is entirely under the control of the network, particularly of the application server AS in the exemplary embodiment herein presented. This facilitates operations like charging and billing the users for the traffic. In particular, the charging of the users in respect of the traffic generated for the combinational service can be handled by the sole application server which, acting as a $3^{rd}$-party controller of the session in the CS domain, possesses all the relevant data for charging the user not only in respect of the PS session, but also in respect of the CS sessions.

2—Setup of Audio Session

Figure 4:
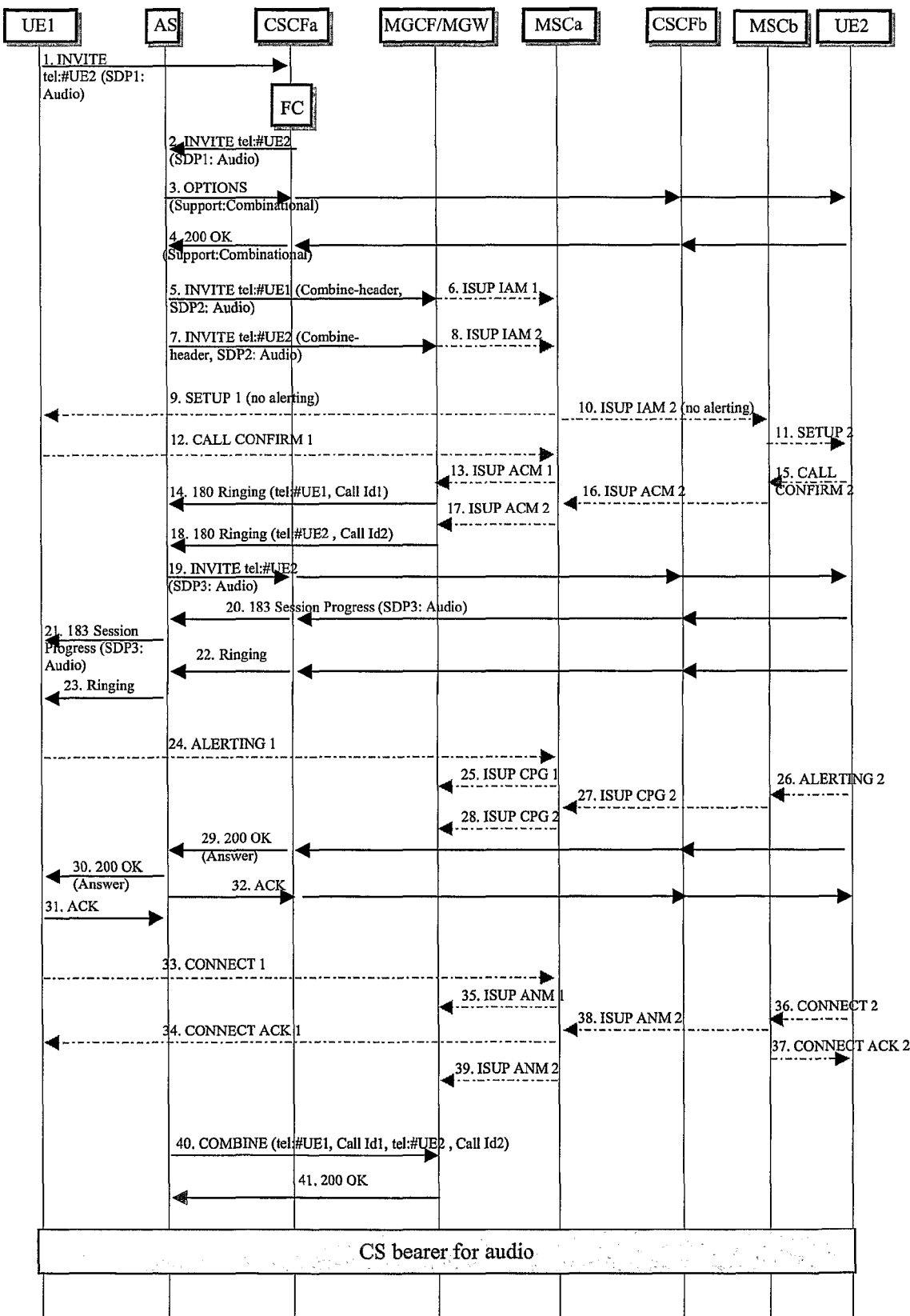
FIG. 4 shows the signalings between the different network entities involved in the setting-up of a CS (audio) session between two UEs, in an embodiment of the present invention.

FIG. 4 shows the signalings between the different network entities in the case of a UE, e.g. UE1, requests the establishment of a session in the sole CS domain (voice call, for example).

Initially, the UE UE1 sends (signaling 1) an INVITE message to the competent CSCF CSCFa, specifying the MSISDN of the called UE UE2 and describing in the message body (by means of the SDP) the session as AUDIO only.

Similarly to the case 1 previously described the CSCF CSCFa applies to the current request by the UE UE1 filter criteria specific for that UE, for example retrieved from the HSS during the previous IMS registration procedure. Since the UE UE1 has specified AUDIO in the SDP of the INVITE message, the filter criteria allow the CSCF determining that the user request relates to a combinational service and the CSCF CSCFa forwards the INVITE message to the application server AS (signaling 2), which takes control of the session.

The application server AS then sends (signaling 3) an OPTIONS message to the called UE UE2, in order to verify if that UE is registered to IMS, and if it supports combinational services. The OPTIONS message is sent to the UE UE2 through the competent CSCF CSCFb.

In the affirmative case, the UE UE2 replies with a 200 OK message (signaling 4), confirming that it supports combinational services and, implicitly, that it is IMS registered.

The application server AS then sends (signaling 5) an INVITE message with a message header COMBINE-HEADER to the MGCF MGCF, specifying the MSISDN of the calling UE UE1 and describing only the media AUDIO in the message body (via the SDP).

The INVITE message sent by the application server causes the MGCF MGCF to send (signaling 6) an ISUP IAM message to the MSC which is currently controlling the calling UE UE1, in the present example the MSC MSCa.

The application server AS also sends (signaling 7) to the MGCF MGCF another INVITE message with a message header COMBINE-HEADER, specifying the MSISDN of the called UE IUE2 and describing only the media AUDIO in the SDP.

This second INVITE message sent by the application server causes the MGCF MGCF to send (signaling 8) an ISUP IAM message to the MSC MSCa which is currently controlling the calling UE UE1.

The MSC MSCa which is currently controlling the calling UE UE1 then sets up two mobile-terminated calls in ISUP toward the UEs UE1 and UE2, (signaling 9 to 18) in a way totally similar to that described in connection to case 1. The establishment of the two CS legs is acknowledged by the MSC MSCa to the MGCF/MGW MGCF/MGW through the ISUP ACM messages (signalings 13 and 17). In this way, the MGCF can acknowledge the establishment of the CS call legs to the application server AS through 180 RINGING messages (signaling 14 and 18). These messages specify the MSISDNs of the calling/called users, and the correspondent Call Identifiers at MGCF level.

Then, the application server AS, acting as a B2BUA, sends (signaling 19) an INVITE message to the called UE UE2, specifying the respective MSISDN and describing in the message body (through the SDP) the media AUDIO. The INVITE message is sent to the UE UE2 through the competent CSCF CSCFb.

The called UE UE2 replies to the SIP INVITE messages as in a normal IMS session, with a 183 SESSION PROGRESS message (signaling 20) and a RINGING message (signaling 22); The application server AS continues to act as a B2BUA in order to control the session progress: the messages received by the called UE UE2 are notified by the application server AS to the calling UE UE1 (signalings 21 and 23).

Meanwhile, on the CS domain side, the establishment of the two CS bearers proceeds, and ISUP messages between the MSC MSCa and the MGCE MGCF make the latter aware of the call establishment progress (signalings 24 to 28), in a way totally similar to that described in connection with case 1 discussed above.

On the PS domain side, the called user UE2 answers, sending a 200 OK message, which is forwarded to the calling UE UE1, and acknowledged back to the UE UE2 (signalings 29 to 32).

When the UE UE1 receives the 200 OK message (thereby realizing that the UE UE2 is answering), it automatically sends to the MSC MSCa an 24.008 CONNECT message (signaling 33). The MSC MSCa acknowledges the UE UE1 (signaling 34), and notifies this to the MGCF/MGW MGCF/MGW by means of an ISUP IAM message (signaling 35).

The UE UE2 automatically sends to the MSC MSCb a 24.008 CONNECT message upon answering, i.e. when it sends the 200 OK message (signaling 36). The MSC MSCb acknowledges the UE UE2 (signaling 37), forwards the CONNECT message to the MSC MSCa as an ISUP ANM message (signaling 38), and the MSC MSCa notifies this to the MGCF/MGW MGCF/MGW (signaling 39).

After the receiving of the 200 OK message (signaling 29) from the called UE UE2, the application server AS sends (signaling 40) a COMBINE message to the MGCF MGCF, specifying:
the called user identity
the call identity of the call leg towards the called user the calling user identity
the call identity of the call leg towards the calling user The MGCF MGCF joins the two CS legs in order to make the UEs UE1 and UE2 connected to each other through a CS bearer for audio, and, via a 200 OK message, it acknowledges (signaling 41) the COMBINE message to AS.

Preferably, if the combining cannot be performed, i.e. if the joining of the two CS call legs is unsuccessful, the MGCF sends an error message COMBINING NOT POSSIBLE to the application server, with the indication of the reason of unsuccess by means of a cause value indication.

It can be appreciated that the setting-up of the CS sessions is entirely under the control of the network, particularly of the application server AS in the exemplary embodiment herein presented.

3—Video Upgrade of the Audio Session

Figure 5:
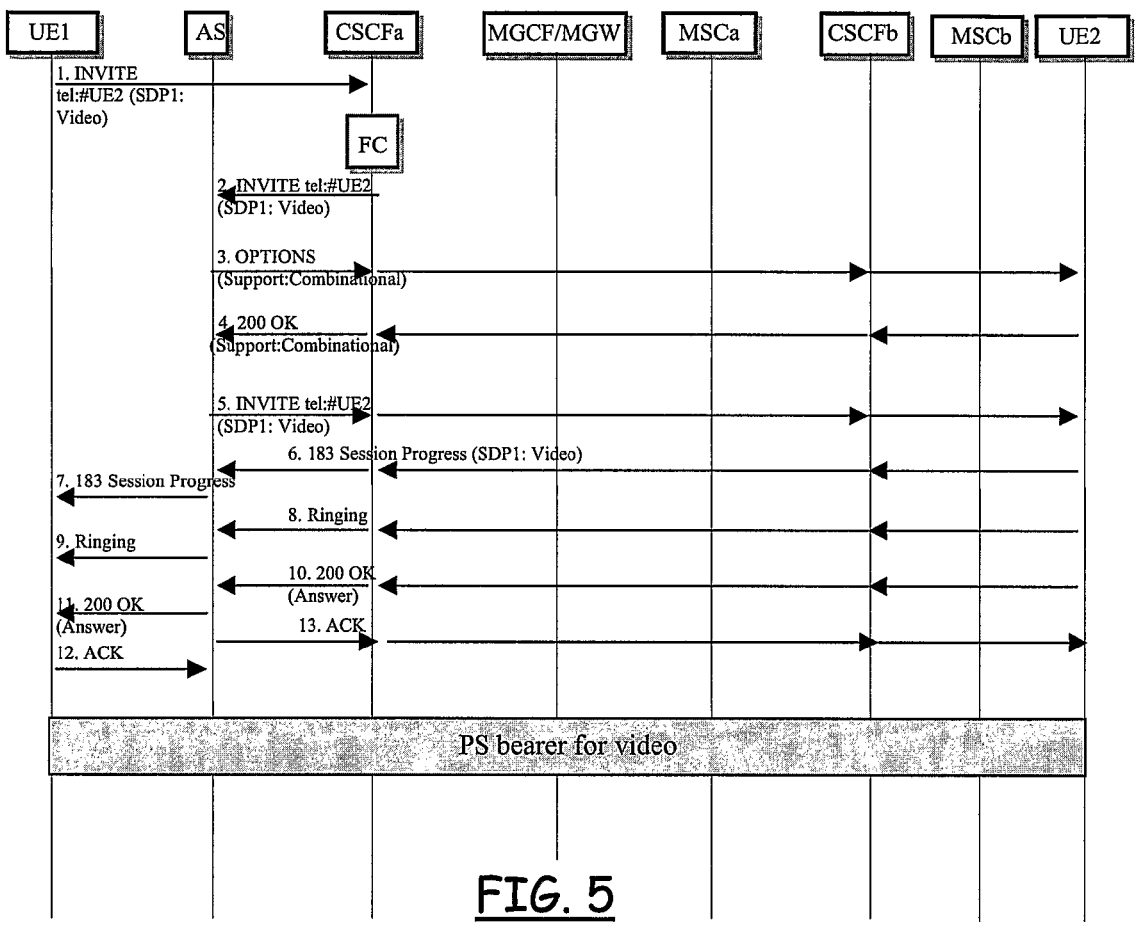
FIG. 5 shows the signaling between the different network entities involved in the upgrade of a CS (audio) session, initially established between two UEs to a combinational CS session plus PS session, in an embodiment of the present invention.

FIG. 5 shows the signalings between the different network entities in the case of a UE, e.g. UE1, requesting the upgrade to a combined CS+PS session of an already established session in the CS domain (for example, the addition of video to an audio-only session).

Initially, the calling UE UE1 sends (signaling 1) an INVITE message to the competent CSCF CSCFa, specifying the MSISDN of the called UE UE2 and describing in the message body (by means of the SDP) the session as VIDEO only.

The CSCF CSCFa applies to the current request by the UE UE1 filter criteria specific for that UE, for example retrieved from the HSS during the previous IMS registration procedure. Since the UE UE1 has already set up an audio session, the filter criteria allow the CSCF determining that the user request relates to a combinational service, and the CSCF CSCFa forwards the INVITE message to the application server AS (signaling 2), which takes control of the session.

The application server AS sends (signaling 3) an OPTIONS message to the called UE UE2, in order to ascertain if that UE is IMS registered, and if it supports combinational services.

In the affirmative case, the UE UE2 replies (signaling 4) with a 200 OK message, confirming that it supports combinational services and, implicitly, that it is IMS registered.

Then, the application server AS, acting as a B2BUA, sends (signaling 5) an INVITE message to the UE UE2, specifying in the message body the respective MSISDN and describing, according to the SDP, only the media VIDEO. The INVITE message is sent to the UE UE2 through the competent CSCF CSCFb.

The called UE UE2 replies (signalings 6 to 9) to the SIP messages as in a normal IMS session. The application server AS continues to act as a SIP Proxy in order to control the session progress.

When the called user answers, the PS bearer is established, and the video session starts on PS domain (signalings 10 to 13).

4—Fallback to Normal CS Call

Figure 6:
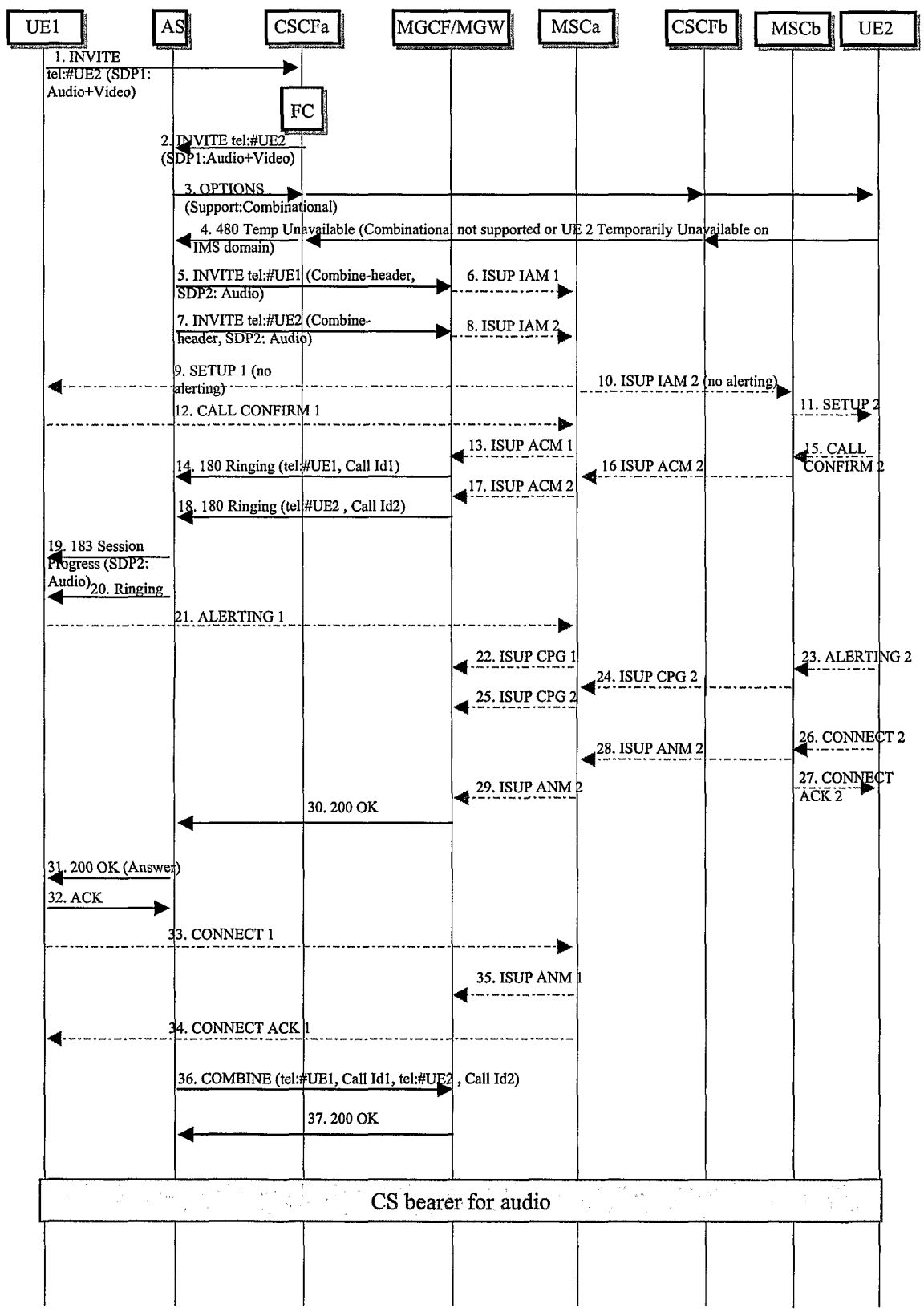
FIG. 6 shows the signalings between the different network entities involved in the fall-back to a simple CS session in case a combinational PS session plus CS session cannot be established between two UEs, in an embodiment of the present invention.

FIG. 6 shows the signalings between the different network entities in case the called user does not support combinational services.

Assuming that the calling UE requesting the establishment of a CS+PS session is UE1, this UE sends (signaling 1) an INVITE message to the competent CSCF CSCFa, specifying the MSISDN of the called UE UE2 and, using the SDP, describing in the message body the session as AUDIO+VIDEO.

The CSCF CSCFa applies UE-specific filter criteria (e.g. retrieved from HSS during the previous IMS registration procedure) to the current request received by the UE UE1.

Since the UE UE1 has specified AUDIO (in addition to VIDEO) in the body of the INVITE message, the filter criteria allow the CSCF determining that the user request relates to a combinational service, and the CSCF forwards the INVITE message to the application server AS (signaling 2), which takes control of the session.

The application server AS sends (signaling 3) an OPTIONS message to the called UE UE2, in order to verify if that UE is IMS registered and if it supports combinational services. The OPTIONS message is sent to the UE UE2 through the competent CSCF CSCFb.

Assuming that the called UE UE2 does not support combinational services, it replies (signaling 4) with a 480 TEMPORARILY UNAVAILABLE message, stating it does not support combinational services or, if the UE UE2 was not IMS registered, it is the competent CSCF CSCFb that replies with a 480 TEMPORARILY UNAVAILABLE message, stating that the UE UE2 is not reachable.

The application server AS sends (signaling 5) an INVITE message with a header COMBINE-HEADER to the MGCF MGCF, specifying the MSISDN of the calling UE UE1 and describing only the media AUDIO in the message body (via the SDP).

The INVITE message sent by the application server causes the MGCF MGCF to send (signaling 6) an ISUP IAM message to the MSC which is currently controlling the UE UE1, in the example the MSC MSCa.

The application server AS then sends (signaling 7) to the MGCF MGCF another INVITE message, with a header COMBINE-HEADER, specifying the MSISDN of the called UE UE2, and describing only the media AUDIO in the message body (via the SDP.

This second INVITE message sent by the application server AS causes the MGCF to send (signaling 8) an ISUP IAM message to the MSC MSCa.

The MSC MSCa, which is currently controlling the UE UE1, sets up (signalings 9 to 18) two mobile-terminated calls in ISUP 3PCC toward the UEs UE1 and UE2, in a way totally similar to that described in the foregoing, e.g. in connection to case 1 discussed before. The establishment of the two CS call legs is acknowledged by the MSC MSCa to the MGCF/MGW MGCF/MGW through the ISUP ACM messages (signalings 13 and 17). In this way, the MGCF can acknowledge the establishment up of the two CS call legs to the application server AS through the 180 RINGING messages (signalings 14 and 18). These messages specify the MSISDNs of the calling/called users and the correspondent Call Identifiers at MGCF level.

The application server AS, acting as a terminating User Agent, sends a 183 SESSION PROGRESS message to the UE UE1, followed by a RINGING message (signalings 19 and 20).

Meanwhile, on the CS domain side, the establishment of the two CS bearers goes on, and ISUP messages between the MSC MSCa and the MGCF MGCF make the latter aware of the call establishment progress (signalings 21 to 30).

After receiving the 200 OK message by the MGCF MGCF (signaling 30), the application server AS, acting as terminating user agent, sends (signaling 31) a 200 OK message to the UE UE1, stating the answer of the UE UE2. The UE UE1 acknowledges (signaling 32) and automatically sends (signaling 33) a 24.008 CONNECT message on the CS domain to the MSC MSCa, which acknowledges (signaling 34) the UE UE1 and notifies (signaling 35) the MGCF MGCF.

After receiving the acknowledge message from the UE UE1 (signaling 32), the application server AS sends (signaling 36) to the MGCF COMBINE message, with a COMBINE-HEADER specifying:

the called user identity;
the call identity of the call leg towards the called user;
the calling user identity; and
the call identity of the call leg towards the calling user.

The MGCF MGCF acknowledges (signaling 37) the COMBINE message to the application server AS, and joins the two CS call legs in order to make the UEs UE1 and UE2 connected to each other through a CS bearer for audio. The CS bearer starts.

Preferably, if the combining cannot be performed, the MGCF MGCF sends to the application server AS an error message (COMBINING NOT POSSIBLE), with the indication of the reason by means of a cause value indication.

5—Session Release

Figure 7:
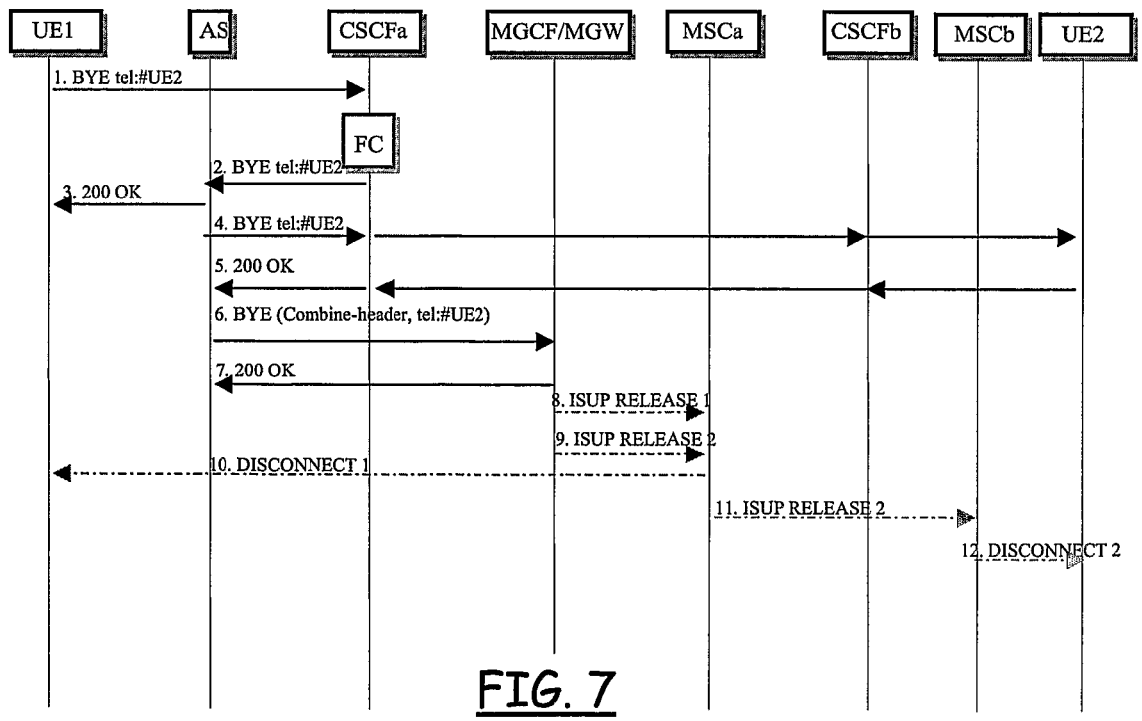
FIG. 7 shows the signalings between the different network entities involved in a combinational session release, in an embodiment of the present invention.

FIG. 7 shows the signalings between the different network entities in case of the release of a combined CS+PS session between two UEs.

Initially, the UE UE1 sends (signaling 1) to the competent CSCF CSCFa a BYE message (a SIP method used for terminating a PS session), specifying the MSISDN of the called UE UE2 (it is observed that the session may be terminated by any of the involved parties, and the BYE message may be sent by the UE UE2 as well).

The CSCF CSCFa applies UE-specific filter criteria to the current request from the UE UE1 (the filter criteria are for example retrieved from the HSS during the previous IMS registration procedure). The filter criteria allow the CSCF determining that the user request relates to a combinational service, the CSCF CSCFa forwards (signaling 2) the BYE message to the application server AS.

The application server AS acknowledges (signaling 3) the BYE message to the UE UE1, sending a 200 OK message. Then, the application server sends (signaling 4) a BYE message to the UE UE2, in order to release the IMS session. The BYE message is sent to the UE UE2 through the competent CSCF CSCFb.

The UE UE2 replies with a 200 OK message (signaling 5), which is intercepted by the application server AS.

The application server AS sends (signaling 6) a BYE message with a header COMBINE-HEADER to the MGCF MGCF, specifying the MSISDN of the called UE UE2.

The MGCF MGCF acknowledges the BYE message to the application server AS, sending (signaling 7) a 200 OK message, and then releases the two CS legs using the common ISUP signaling towards the MSC MSCa (ISUP RELEASE and DISCONNECT messages—signalings 8 to 12).

6—Session Hold and Resume

Figure 8:
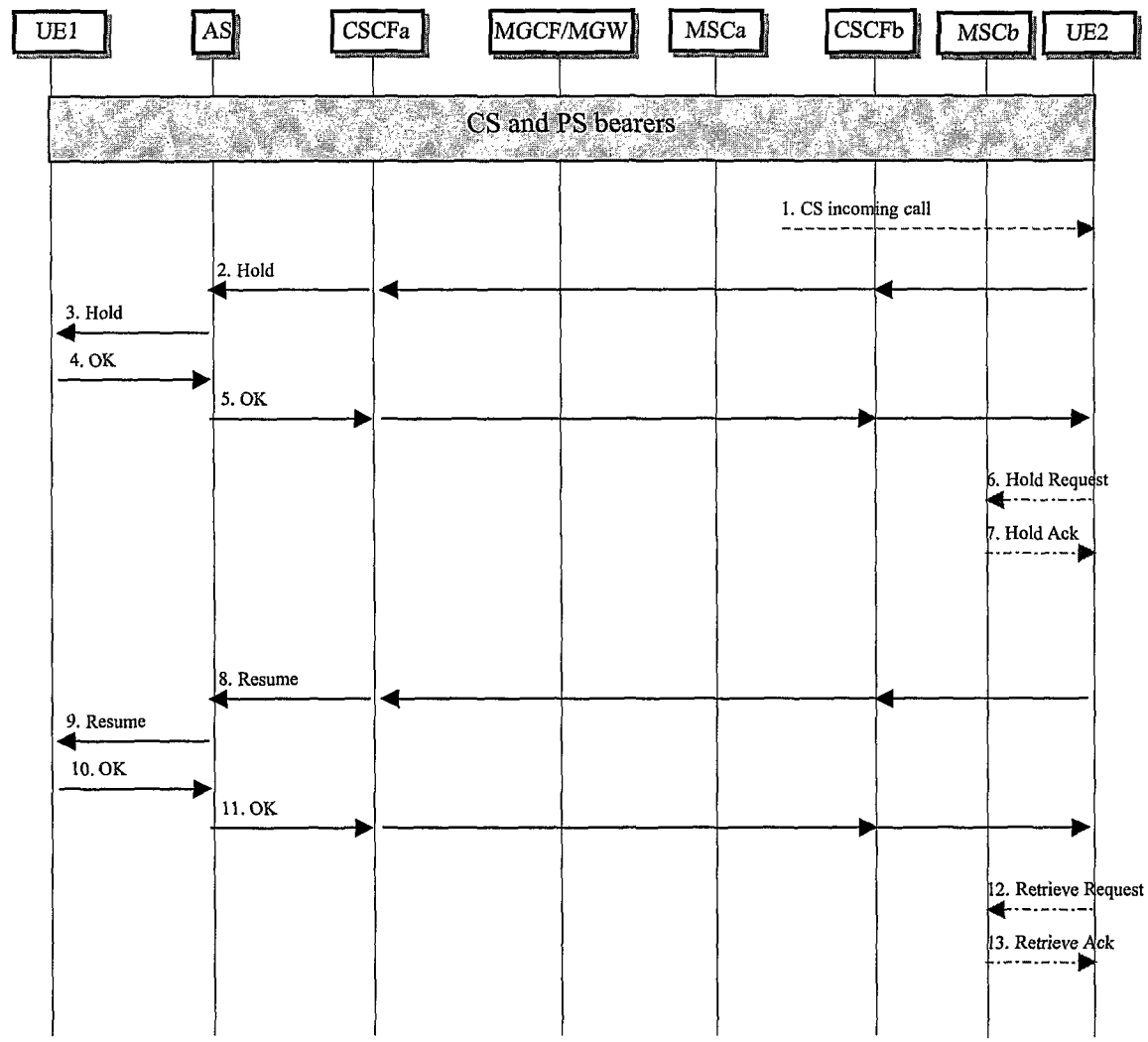
FIG. 8 shows the signalings between the different network entities involved in a combinational CS plus PS session hold and resume, in an embodiment of the present invention.

FIG. 8 shows the signalings between the different network entities in case a combined CS+PS session is placed in hold and later resumed, for example because one of the involved users, e.g. UE UE2, is notified of another (CS) incoming call.

The session hold/resume is handled end-to-end on request of the UE which is receiving the alternative CS incoming call, in the example UE UE2.

Initially, a CS incoming call is signaled (signaling 1) to the UE UE2, like a traditional CS CALL WAITING.

The UE UE2 requests (signaling 2) the HOLD state for the ongoing IMS session (PS data). The application server AS acts as a B2BUA; the HOLD request is intercepted by the application server, which forwards it to the UE UE1 (signaling 3); the UE UE1 acknowledges the HOLD request (signaling 4), and the acknowledgement is forwarded to the UE UE2 (signaling 5).

The UE UE2 then requests to the competent MSC MSCb the HOLD state for the CS side of the session, using the conventional 24.008 signaling towards the MSC MSCb (signalings 6 and 7).

The combined CS+PS session is thus placed in hold.

The session is resumed to the active state in a similar way, with RESUME requests instead of HOLD (signalings 8 to 13).

7—Audio+Video with Call Forwarding Unconditional (CFU) and Call Forwarding on Busy (CFB)

Figure 9:
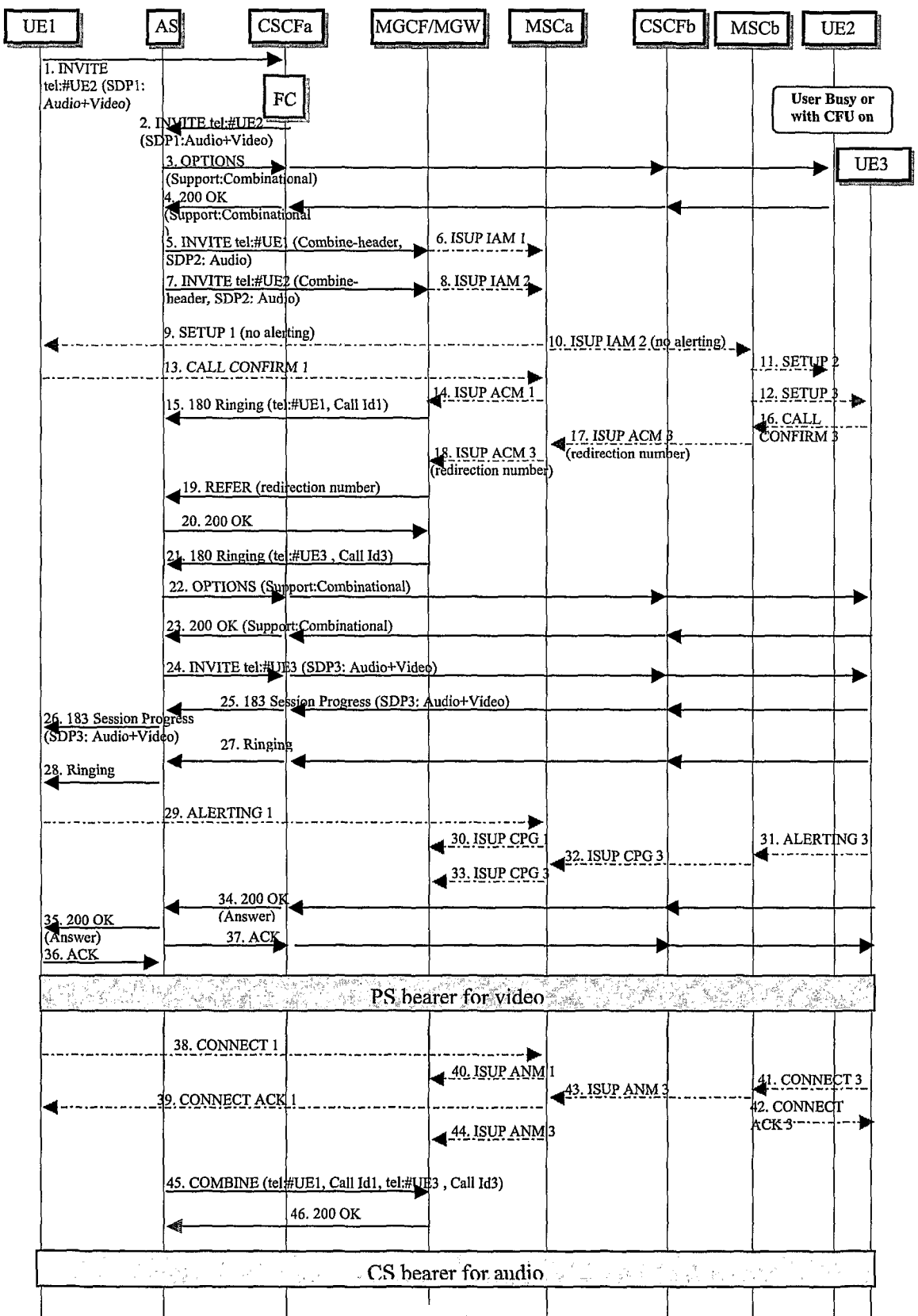
FIGS. 9 and 10 show the signaling between the different network entities involved in two cases in which a call forwarding feature is enabled, in an embodiment of the present invention.

FIG. 9 shows the signalings between the different network entities, in the case a CFU or a CFB features are enabled, and shows how a CFU feature and a CFB feature interact with the combined audio+video session setup.

The initial phases (signalings 1 to 11) of the combinational CS+PS (audio+video) session setup are the same as in the set-up case previously described, e.g. in connection with case 1 previously discussed.

In case the called UE UE2 is busy or an unconditional call forwarding feature is enabled, a CFU or a CFB occur, the competent MSC MSCb forwards the CS call set-up request (signalings 12 and 16) to the redirection UE (UE3 in FIG. 9). The redirection UE number is brought backwards to the MGCF MGCF by the ISUP message ACM (signalings 17 and 18.).

The MGCF MGCF sends (signaling 19) a REFER message to the application server AS, in order to make it aware of the redirection which is occurred for the CS leg initially intended towards the UE UE2

Once the MGCF MGCF has received from the application server AS the 200 OK message acknowledging (signaling 20) the REFER message, it sends (signaling 21) A 180 RECEIVING message to application server AS, for the setting up of the CS leg towards the redirection UE UE3.

The application server AS sends (signaling 22) an OPTIONS message to the redirection UE UE3, in order to verify if that UE is IMS registered and if it supports combinational services. The OPTIONS message is sent to the UE UE3 through the competent CSCF, e.g. CSCF CSCFb.

In the affirmative case the UE UE3 replies (signaling 23) with a 200 OK message, confirming that it supports combinational services and, implicitly, that it is IMS registered.

The session setup continues (signalings 24 to 46) as a CS+PS session setup described in the foregoing, but between the UEs UE1 and UE3, instead that between the UEs UE1 and UE2.

8—Audio+Video with Call Forwarding on No Reply (CFNRy)

Figure 10:
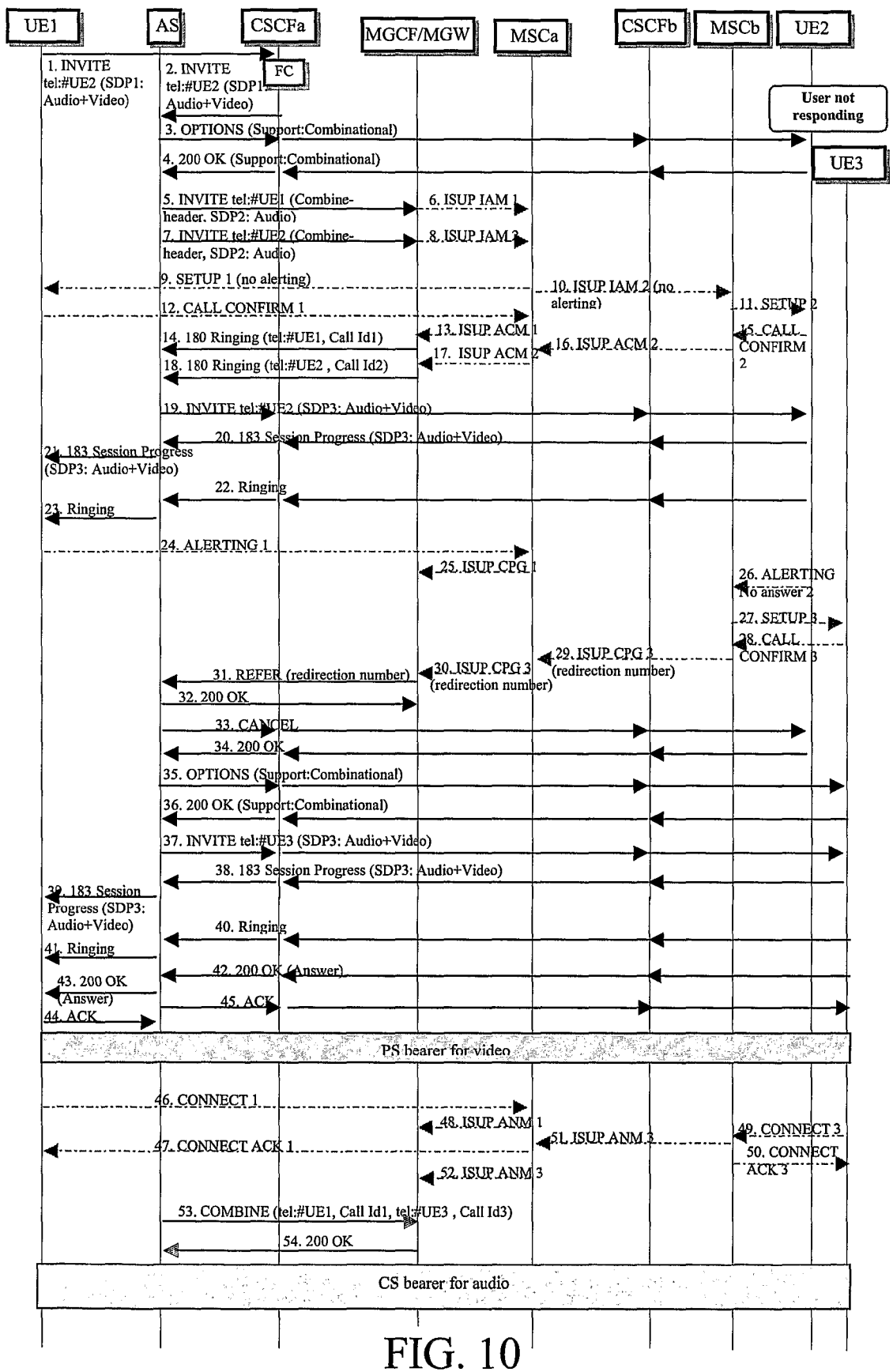

FIG. 10 shows the signalings between the different network entities, in the case a CFNRy feature is enabled, and shows how the CFNRy feature interacts with the combinational CS+PS (audio+video) session setup.

The initial phases (signalings 1 to 26) of the combinational CS+PS (audio+video) session setup are the same as in the set-up case previously described (case 1).

In case the user of the called UE UE2 does not answer, a CFNRy occurs (signalings 27 to 30). The redirection number is brought backwards to the MGCF MGCF by the ISUP message CPG (signalings 29 and 30).

Similarly to the preceding case 7, the MGCF MGCF sends (signaling 31) a REFER message to the application server AS, in order to make it aware of the redirection which is occurred for the CS leg initially directed towards the UE UE2.

The application server AS sends a 200 OK message (signaling 32), for acknowledging the REFER message, and sends (signaling 33) a CANCEL message to the UE UE2, in order to cancel the IMS session setup of the UE UE2. It is observed that in this case, differently from the case described in connection with FIG. 9, the CANCEL message is necessary because, from the network viewpoint, the establishment of the combinational PS+CS session has already proceeded relatively far (the network can not know in advance that the called user will decide not to answer the call), while in the case of call forwarding on busy or on CFU the network, being aware of the fact that the called user will not be available, deviated the call towards the redirection number at an earlier stage.

Once the application server AS has received from the UE UE2 the 200 OK acknowledge message to the CANCEL message (signaling 34), it sends (signaling 35) an OPTIONS message to the redirection UE UE3 in order to ascertain if that UE is IMS registered and if it supports combinational services.

The UE UE3 replies (signaling 36) with a 200 OK message, confirming that it supports combinational services and, implicitly, that it is IMS registered.

The session setup continues (signalings 37 to 54) as a CS+PS session setup described in the foregoing, but between the UEs UE1 and UE3, instead that between the UEs UE1 and UE2.

* * *

Thanks to the present invention, particular embodiments of which have been presented in the foregoing, the implementation of combinational services is rendered network-centric, rather than UE-centric, and this is advantageous under several respects, such as unified charging and billing (which can for example be managed by the same application server in the PS domain that is responsible of providing the combinational services).

Additionally, the fact that the application server in the PS domain controls the signalings both in the PS-domain and, through the MGCF, in the CS-domain, allows the network operator implementing new services and/or new functionalities in already existing services by simply using standard signalings, driven by the application server, substantially without the need of modifying the UEs.

Although the present invention has been disclosed and described by way of some embodiments, it is apparent to those skilled in the art that several modifications to the described embodiments, as well as other embodiments of the present invention are possible without departing from the spirit or essential features thereof/the scope thereof as defined in the appended claims.

The invention claimed is:

1. In a mobile communication system comprising a circuit-switched mobile communications network, a packet-switched mobile communications network and an interworking function that enables a signaling exchange between the circuit-switched and packet-switched mobile communications networks, a method of providing combinational circuit-switched plus packet-switched services to mobile users, wherein the combinational circuit-switched plus packet-switched services are a combination of services delivered through at least one circuit-switched session and at least one concurrent packet-switched session between the mobile users, the method comprising:

receiving, at a serving network entity in the packet-switched mobile communications network, a user request issued from a first user on the packet-switched mobile communications network, the user request relating to combinational services; and having the serving network entity manage the received request, wherein managing the received request comprises controlling an establishment of a session in the circuit-switched mobile communications network through the interworking function, by sending to the interworking function:

a first signaling for establishing a first circuit-switched session with the first user;

at least one second signaling for establishing at least one second circuit-switched session with at least one second user; and a third signaling for causing the interworking function to join the first and the at least one second circuit-switched sessions, thereby establishing a circuit-switched bearer in the circuit-switched mobile communications network between the first user and the at least one second user; and wherein the established circuit-switched bearer is controlled through one or more packet-switched signals received by the serving network entity in the packet-switched mobile communications network.

2. The method according to claim 1, wherein said packet-switched mobile communications network comprises an internet protocol multimedia subsystem network infrastructure.

3. The method according to claim 2, wherein the interworking function comprises a media gateway control function that interacts with a media gateway in the circuit-switched mobile communications network.

4. The method according to claim 2, wherein the serving network entity comprises an application server of the internet protocol multimedia subsystem network infrastructure.

5. The method according to claim 4, wherein the user request, comprises session initiation protocol methods.

6. The method according to claim 5, wherein the serving network entity communicates with the interworking function via session initiation protocol signalings.

7. The method according to claim 6, wherein the session initiation protocol signalings issued by the serving network entity to the interworking function are tagged as inherent to combinational services, and the interworking function recognizes the tagged session initiation protocol signalings received from the serving network entity.

8. The method according to claim 7, wherein the tagging of the session initiation protocol signalings is included in a session initiation protocol message header.

9. The method according to claim 3, wherein a signaling in the circuit-switched mobile communications network is chosen in a set consisting of 3GPP TS 24.008 signaling, Q.931 protocol signaling, X.31 protocol signaling, and user-to-network protocol signaling.

10. The method according to claim 1, wherein said interworking function communicates with the circuit-switched mobile communications network by means of ISUP signalings.

11. The method according to claim 1, wherein said managing of the received request comprises:

identifying the received request as a request o set-up at least a circuit-switched session with at least one second user.

12. The method according to claim 11, wherein said identifying the request from the first user as a request to set-up at least a circuit-switched session with the at least one second user comprises identifying the request from the first user as a request to set-up a combinational circuit-switched plus packet-switched session with the at least one second user, said managing the received request further comprising:

in addition to said setting-up the circuit-switched session with the second user, setting-up at least one packet-switched session with the second user, said setting up the at least one packet-switched session comprising establishing at least one packet-switched bearer in the packet-switched mobile communications network.

13. The method according to claim 12, further comprising:
ascertaining an availability of the second user to support the combinational circuit-switched plus packet-switched session.

14. The method according to claim 13, wherein said setting-up at least one packet-switched session with the second user is conditioned to an ascertained availability of the at least one second user to support a packet-switched session.

15. The method according to claim 11, wherein said managing the received request comprises:
identifying the received request as a request to set-up a packet-switched session with at least one second user; and
setting-up a packet-switched session with the second user, said setting up the packet-switched session comprising establishing a packet-switched bearer in the packet-switched mobile communications network.

16. The method according to claim 1, further comprising:
receiving, at the serving network entity, a further user request relating to a previously established combinational service, the previously established combinational service comprising at least a circuit-switched session between a first and at least one second user; and
having the serving network entity managing the received further user request.

17. The method according to claim 16, wherein said managing the received further user request comprises:
identifying the received further user request as a request to release the previously established combinational service;
signaling the interworking function to cause a release, in the circuit-switched mobile communications network, of a circuit-switched bearer that corresponds to the circuit-switched session.

18. The method according to claim 17, wherein the previously established combinational service comprises a combinational circuit-switched plus packet-switched session, said managing the received further user request comprising:
causing a release, in the packet-switched mobile communications network, of a packets witched bearer that corresponds to the packet-switched session.

19. The method according to claim 16, wherein said managing the received further user request comprises:
identifying the received further user request as a request to temporarily place in hold the previously established combinational service, wherein the previously established combinational service comprises a circuit-switched plus packet-switched session including a packet-switched bearer in the packet-switched mobile communications network, and a circuit-switched bearer in the circuit-switched mobile communications network; and
placing in hold the packet-switched bearer.

20. The method according to claim 19, wherein said managing the received further user request comprises:
identifying the received further user request as a request to resume the previously established combinational circuit-switched plus packet-switched session temporarily placed in hold; and
resuming the packet-switched bearer.

21. The method according to claim 1, wherein said managing the received request comprises:
managing a redirection of a user request directed to a second user to a third user, in case a call forwarding feature is enabled.

22. A mobile communication system comprising:
a circuit-switched mobile communications network;
a packet-switched mobile communications network;
an interworking function configured to enable a signaling exchange between the circuit-switched and packet-switched mobile communications networks; and
a serving network entity in the packet-switched mobile communications network, configured to:
receive a user request issued from a first user on the packet-switched mobile communications network, the user request relating to combinational services being a combination of services delivered through at least one circuit-switched session and at least one concurrent packet-switched session between the first user and at least one second user, and
manage the received request, wherein managing the received request comprises controlling an establishment of a session in the circuit-switched mobile communications network through the interworking function, by sending to the interworking function:
a first signaling for establishing a first circuit-switched session with the first user;
at least one second signaling for establishing at least one second circuit-switched session with at least one second user; and
a third signaling for causing the interworking function to join the first and the at least one second circuit-switched sessions, thereby
establishing a circuit-switched bearer in the circuit-switched mobile communications network between the first user and the at least one second user; and
wherein the established circuit-switched bearer is controlled through one or more packet-switched signals received by the serving network entity in the packet-switched mobile communications network.

23. The mobile communications system according to claim 22, wherein said packet-switched mobile communications network includes an internet protocol multimedia subsystem network infrastructure.

24. The mobile communications system according to claim 23, wherein the interworking function comprises a media gateway control function configured to interact with a media gateway in the circuit-switched mobile communications network.

25. The mobile communications system according to claim 23, wherein the serving network entity comprises an application server of the internet protocol multimedia subsystem network infrastructure.

26. The mobile communications system according to claim 25, wherein the user request comprises session initiation protocol methods.

27. The mobile communications system according to claim 26, wherein the serving network entity is configured to communicate with the interworking function via session initiation protocol signalings.

28. The mobile communications system according to claim 24, wherein a signaling in the circuit-switched mobile communications network is chosen in a set consisting of 3GPP TS 24.008 signaling, Q.931 protocol signaling, X.31 protocol signaling and user-to-network protocol signaling.

29. The mobile communications system according to claim 22, wherein said interworking function is configured to communicate with the circuit-switched mobile communications network by means of ISUP signaling.

* * * * *

UNITED STATES PATENT AND TRADEMARK OFFICE
CERTIFICATE OF CORRECTION

| | | |
|---|---|---|
| PATENT NO. | : 9,036,620 B2 | Page 1 of 1 |
| APPLICATION NO. | : 11/664676 | |
| DATED | : May 19, 2015 | |
| INVENTOR(S) | : Procopio et al. | |

It is certified that error appears in the above-identified patent and that said Letters Patent is hereby corrected as shown below:

In the claims

Claim 5, column 22, line 34, "request, comprises" should read --request comprises--.

Claim 18, column 23, line 47, "packets witched" should read --packet-switched--.

Signed and Sealed this
First Day of March, 2016

Michelle K. Lee
*Director of the United States Patent and Trademark Office*